US012530603B2

(12) United States Patent
Mahmoud et al.

(10) Patent No.: US 12,530,603 B2
(45) Date of Patent: Jan. 20, 2026

(54) OBTAINING AND UTILIZING FEEDBACK FOR AGENT-ASSIST SYSTEMS

(71) Applicant: Cisco Technology, Inc., San Jose, CA (US)

(72) Inventors: Mohamed Gamal Mohamed Mahmoud, Santa Clara, CA (US); Elizabeth Hutton, San Francisco, CA (US); Bhavana Bhasker, San Jose, CA (US); Muthu Kumaran Ponnambalam, Union City, CA (US); Puneet Shrivastava, Madhya Pradesh (IN); Duraikrishna Selvaraju, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 1014 days.

(21) Appl. No.: 17/332,099

(22) Filed: May 27, 2021

(65) Prior Publication Data

US 2022/0383153 A1 Dec. 1, 2022

(51) Int. Cl.
*G06N 5/04* (2023.01)
*G06N 5/02* (2023.01)

(52) U.S. Cl.
CPC .............. *G06N 5/04* (2013.01); *G06N 5/02* (2013.01)

(58) Field of Classification Search
CPC .. G06N 5/00; G06N 5/02; G06N 5/04; G06Q 10/10; G06F 9/453; G06F 40/30; G06F 11/0793

See application file for complete search history.

(56) References Cited

U.S. PATENT DOCUMENTS 10,395,648 B1 * 8/2019 Benkreira .............. G06Q 30/01
10,430,517 B1 10/2019 Mulwad et al.
(Continued)

FOREIGN PATENT DOCUMENTS

WO WO2020205316 A1 10/2020

OTHER PUBLICATIONS

Office Action for U.S. Appl. No. 17/331,986, mailed on Dec. 23, 2022, Mohamed Gamal Mohamed Mahmoud, "Providing Agent-Assist, Context-Aware Recommendations", 46 pages.
(Continued)

*Primary Examiner* — Michael J Huntley
*Assistant Examiner* — Christopher Dillon Devore
(74) *Attorney, Agent, or Firm* — Lee & Hayes, P.C.

(57) ABSTRACT

Techniques for agent-assist systems to provide context-aware, subdocument-granularity recommended answers to agents that are attempting to answer queries of users. The agent-assist system may obtain collections of documents that include information for responding to queries, and analyze those documents to identify subdocuments that are associated with different semantics or meanings. Subsequently, any queries received can be analyzed to identify their semantics, and relevant subdocuments can be identified as having similar semantics. When the agent-assist system presents the agent with the relevant documents, it may highlight or otherwise indicate the relevant subdocument within the document for quick identification by the agent. Further, the agent-assist system may collect feedback from the agent and/or user to determine a relevancy of the recommended answers. The agent-assist system can use the feedback to improve the quality of the recommended answers provided to the agents.

17 Claims, 12 Drawing Sheets

(56) References Cited

U.S. PATENT DOCUMENTS

| | | |
|---|---|---|
| 10,445,745 B1 | 10/2019 | Chopra et al. |
| 10,708,424 B1 | 7/2020 | Maestas |
| 11,042,700 B1* | 6/2021 | Walters ................ G06F 40/169 |
| 11,076,047 B1* | 7/2021 | Clodore ................ G06Q 30/01 |
| 11,294,974 B1 | 4/2022 | Shukla et al. |
| 2006/0293886 A1* | 12/2006 | Odell ..................... G10L 15/08 |
| | | 704/231 |
| 2008/0120287 A1 | 5/2008 | Guan et al. |
| 2009/0049133 A1* | 2/2009 | Odom ..................... G06Q 10/10 |
| | | 709/206 |
| 2009/0097634 A1 | 4/2009 | Nambiar et al. |
| 2010/0235164 A1 | 9/2010 | Todhunter et al. |
| 2010/0274618 A1 | 10/2010 | Byrd et al. |
| 2011/0033036 A1 | 2/2011 | Edwards et al. |
| 2015/0169676 A1 | 6/2015 | Bohra |
| 2016/0191709 A1 | 6/2016 | Pullamplavil et al. |
| 2017/0249311 A1* | 8/2017 | Pelleg ..................... G06N 5/04 |
| 2018/0054523 A1* | 2/2018 | Zhang ................ H04M 7/0045 |
| 2018/0276005 A1* | 9/2018 | James ................ G06Q 30/0269 |
| 2019/0236205 A1 | 8/2019 | Jia et al. |
| 2020/0005503 A1* | 1/2020 | He ............................ G06N 3/08 |
| 2020/0364511 A1* | 11/2020 | Brown ................ G06F 16/3329 |
| 2021/0132754 A1 | 5/2021 | Sterin et al. |
| 2021/0150147 A1 | 5/2021 | Yu et al. |
| 2021/0374671 A1* | 12/2021 | Li ............................ G10L 15/26 |
| 2022/0124056 A1 | 4/2022 | Cress et al. |
| 2022/0156298 A1 | 5/2022 | Mahmoud et al. |

OTHER PUBLICATIONS

Office Action for U.S. Appl. No. 17/331,986, mailed on Jun. 22, 2023, Inventor #1 Mohammad Gamal Mohamed Mahmoud, "Providing Agent-Assist, Context-Aware Recommendations," 64 pages.

Vasilateanu, et al., "Call-Center Virtual Assistant Using Natural Language Processing and Speech Recognition", Journaeceivedl of ICT, Design, Engineering and Technological Science (JITDETS) vol. 2, No. 2, pp. 40-46, Dec. 2018, 7 pages.

* cited by examiner

OBTAINING AND UTILIZING FEEDBACK FOR AGENT-ASSIST SYSTEMS

TECHNICAL FIELD

The present disclosure relates generally to an agent-assist system that provides context-aware recommendations to agents that are attempting to answer queries of users, and improves the quality of the recommended answers provided to agents when responding to the queries of users.

BACKGROUND

Across many industries, contact centers are used for receiving large volumes of inquiries from users (often customers) of different products, services, and various offerings from companies or organizations. Contact centers can be centralized offices, and/or decentralized offices (e.g., remote agents), used for receiving inbound communications from users (e.g., telephone calls, Short Message Service (SMS) messages, etc.), and dispatching those inbound communications to agents that are trained to help users with their inquiries. However, these contact centers often field inquires across many different topics or domains, such as for different companies, different products, different industries, and so forth.

When it comes to solving user issues and answering user inquiries, a key skill for contact-center agents is domain and technical expertise. To obtain domain and technical expertise, these agents often need extensive training and experience to build expertise in a specific domain. However, contact centers often face a lot of turnover or churn in their agents, and it can be difficult to find, train, and keep agents that are skilled in specific domains. As a result, agents handing user-support calls typically need assistance in the domain. Typically, agents find responses to queries by looking up the answers in documents, searching knowledge bases, and consulting with other agents in the contact center. However, this increases call handling time, decreases agent productively, and can frustrate customers or users.

To help alleviate the burden on agents, agent-assist systems have been developed to help agents that are handling user interactions by recommending resources or answers that are relevant to a user's issue or inquiry. The purpose of these agent-assist systems is to decrease the average call handling time (AHT), increase the resolution rate for user interactions, minimize agent training time, and provide fast and accurate sources of information to agents. However, agent-assist systems can provide recommended answers or documents that are not pertinent to the query, which decreases performance by the agent and reduces user satisfaction. Additionally, the agent-assist systems can surface information or answers that are not relevant to the inquires received from the user. Accordingly, agent-assist systems may not actually provide helpful or useful assistance to agents in some scenarios.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
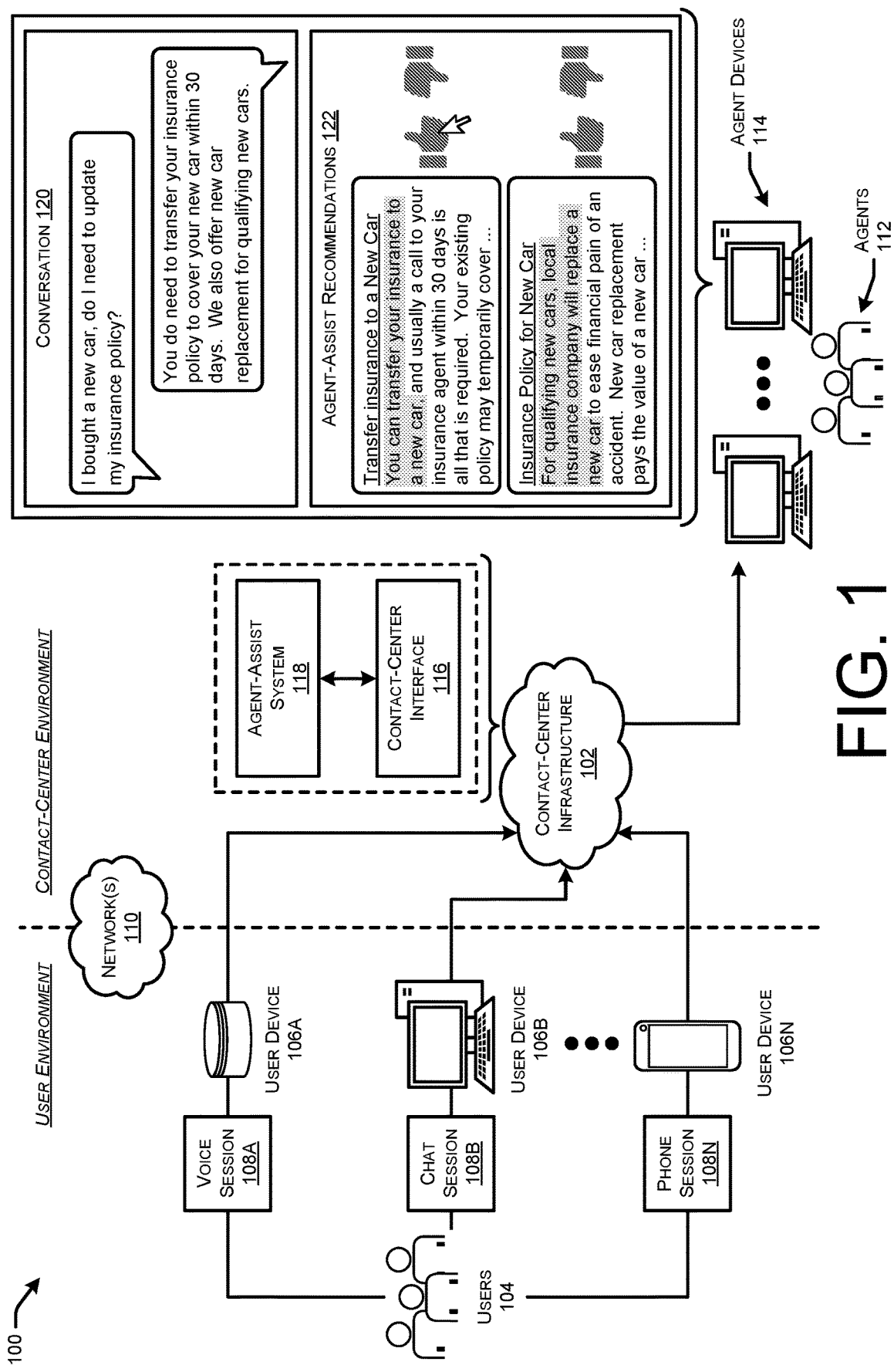
FIG. 1 illustrates a system-architecture diagram of an example environment in which an agent-assist system provides recommended answers for an agent of a contact-center environment to use when responding to a query from a user.

The present disclosure relates generally to agent-assist systems that are able to provide context-aware, subdocument-granularity recommended answers to agents that are attempting to answer queries of users, and improving the quality of the recommended answers provided by the agent-assist systems based on feedback from the agents.

A first method described herein includes techniques for an agent-assist system to provide recommended answers to agents that are assisting users. The first method may include obtaining a plurality of documents relating to different topics, and identifying subdocuments from each of the plurality of documents. Further, the first method may include establishing a communication session between a user device and an agent device to facilitate a conversation between a user of the user device and an agent associated with the agent device. Additionally, the first method may include identifying first input received from the user device, the first input representing a query of the user for the agent to answer, and identifying, from the subdocuments, a first subdocument as including first text that is semantically related to the query. Additionally, the method may include causing presentation of a document that includes the first subdocument on a display of the agent device, and causing presentation of a visual indicator on the display that indicates the first subdocument as being relevant to the query. Generally, the visual indicator distinguishes the first text of the first subdocument relative to remaining text in the document.

A second method described herein may include obtaining, at an agent-assist system, a plurality of documents relating to different topics, and identifying, from a first document of the plurality of documents, a first subdocument that is semantically related to a first topic. The second method may further include generating a first embedding indicating that the first subdocument is semantically related to the first topic. Additionally, the second method may include identifying, from a second document of the plurality of documents, a second subdocument that is semantically related to a second topic, and generating a second embedding indicating that the second subdocument is semantically related to the second topic. Further, the second method may include establishing a communication session between a user device and an agent device, the communication session facilitating a conversation between a user of the user device and an agent associated with the agent device. Even further, the method may include identifying input received from the user device, the first input representing a query of the user for the agent to answer, and generating a third embedding indicating a semantic associated with the query. The second method may further include determining that the third embedding is more similar to the first embedding than the second embedding. Additionally, the second method may include causing presentation of the first document that includes the first subdocument on a display of the agent device, and causing presentation of a visual indicator on the display that indicates the first subdocument as being relevant to the query.

A third method described herein includes techniques for obtaining implicit feedback indicating a relevancy of recommended answers for an agent to respond to a user. The third method may include establishing a communication session between a user device and an agent device, and receiving, from the user device, first input from the user engaged in the communication session. Further, the third method may include identifying, from the first input, a query that the user has for the agent to answer, and identifying, from a knowledge base of the agent-assist system, a recommended answer for responding to the query. Additionally, the third method may include causing presentation of the recommended answer on a display associated with the agent device, and receiving, from the agent device, second input that includes an answer provided by the agent to the query. The third method may include determining implicit feedback indicating a relevancy of the recommended answer for responding to the query, and adjusting a confidence value associated with the recommended answer being used for responding to the query based at least in part on the implicit feedback. Generally, the confidence value indicates a likelihood that the recommended answer is relevant to use for responding to the query.

A fourth method described herein may be performed by an agent device and include techniques for obtaining implicit feedback indicating a relevancy of recommended answers for an agent to respond to a user. The fourth method may include establishing a communication session with a user device, and presenting, on a display of the agent device, one or more user interfaces (UIs) that represents at least the conversation between the and the user. Further the fourth method may include receiving first input from the user device, the first input representing a query from the user for the agent to answer, and receiving, from an agent-assist system, a recommended answer for responding to the query. Additionally, the fourth method may include presenting the recommended answer in the one or more UIs on the display, and identifying second input at the agent device, the second input representing an answer provided by the agent to respond to the query. Even further, the fourth method may include determining implicit feedback indicating a relevancy of the recommended answer for responding to the query, and providing the implicit feedback to the agent-assist system.

Additionally, the techniques of at least the first method, second method, third method, and fourth method, and any other techniques described herein, may be performed by a system and/or device having non-transitory computer-readable media storing computer-executable instructions that, when executed by one or more processors, performs the method(s) described above.

Example Embodiments

Contact centers often use agent-assist systems to help agents find more relevant answers to queries from users or customers in a shorter period of time than if the agents had to locate the answers themselves. These agent-assist systems have been designed to search large corpora of documents across different topics in order to identify documents or recommended answers that are relevant to answering a query of a user. Ideally, these agent-assist systems will help agents enough to decrease the average call handling time, increase the resolution rate for user interactions, and/or provide the agents with faster and more accurate sources of information. However, agent-assist systems can provide recommended answers or documents that are not pertinent to the query, which decreases performance by the agent and reduces user satisfaction. Additionally, the agent-assist systems can surface information or answers that are not relevant to the inquires received from the user. Accordingly, agent-assist systems may not actually provide helpful or useful assistance to agents in some scenarios.

The present disclosure relates generally to agent-assist systems that are able to provide context-aware, subdocument-granularity recommended answers to agents that are attempting to answer queries of users, and improving the quality of the recommended answers provided by the agent-assist systems based on feedback from the agents. The agent-assist system may obtain large collections of documents that include information for responding to queries, and analyze those documents to identify portions, or "subdocuments," or the documents (e.g., paragraphs, sentences, etc.) that are associated with different semantics, or meanings. Subsequently, any queries received can be analyzed to identify their meaning or semantics, and relevant subdocuments can be identified as having similar semantics. When the agent-assist system presents the agent with the relevant documents, it may highlight or otherwise indicate the relevant subdocument within the document for quick identification by the agent.

After presenting the subdocuments, the agent-assist system may collect feedback from the agent and/or user in the conversation to determine a relevancy of the recommended answers or information. In some instances, the agent-assist system may collect implicit feedback, such as by determining if the agent used the answer as a response to the user, determining how long the recommended answer was in a viewport of the agent's device, determining whether the sentiment of the user increased or decreased after the answer, etc. As an example, if the agent used the recommended answer, and the user's sentiment increased after hearing the answer (e.g., user exclaims "thank you!"), then the confidence value for the recommended answer being relevant to the query may be increased. In this way, the agent and/or user may provide implicit feedback that is usable to increase the relevancy of recommended answers provided by the agent-assist systems.

Although the techniques described herein are primarily with respect to agents of contact centers, the techniques are equally applicable across any industry, technology, environment, etc.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an agent-assist system provides recommended answers for an agent of a contact-center environment to use when responding to a query from a user.

As illustrated, a contact-center infrastructure 102 may be part of a contact-center environment. The contact-center infrastructure 102 may generally comprise the set of hardware, software, and telecommunication network components used to support conversations and communication sessions between users 104 and agents 112. The contact-center infrastructure 102 may deliver intelligent contact routing, call streaming, network-desktop computer telephone systems, and multi-channel contact management over an Internet Protocol (IP) infrastructure to call center agents 112 located anywhere in the contact-center environment. The contact-center infrastructure 102 may include hardware and software components, such as unified communications managers for call routing, management software for contact-center routing and agent management, voice portal for queueing and self-service, agent desktop applications for agent desktop software, web-based reporting and administration software, media recording software, Internet Protocol (IP) phones, Local Area Networks (LANs) and Wide Area Networks (WANs) components, network management tools, video components and endpoints, and so forth.

Generally, the contact-center infrastructure 102 may establish communication sessions between user devices 106 operated by users 104 and agent devices 114 operated by agents 112. The user devices 106 and agent devices 114 may each any type or one of computing device configured to communicate over one or more networks 110, such as mobile phones, tablets, laptop computers, desktop computers, televisions, servers, wearable devices, servers, automobile computing devices, voice-controlled devices (e.g., virtual-agent based devices), and/or any other type of computing device.

The communication sessions established between the user devices 106 and the agent devices 114 may be one or more of, or any combination of, video communication sessions, audio communication sessions, telephone-based sessions, IP-network based sessions, email sessions, text-based sessions, messaging sessions, and/or any other type of communication sessions. Thus, while FIG. 1 may illustrate a voice session 108 A using a voice-controlled user device 106A, a chat session 108B using a desktop computing device 106B, and a phone session 108N using a mobile phone device 106N, the devices 106 and/or sessions 108 may be any type of devices 106 and/or sessions 108. The network(s) 110 may be used to facilitate the communication sessions between the user devices 106 and the agent devices 114. The network(s) 110 may include one or more of, or any combination of, wired and/or wireless networks such as personal area networks (PANs), wired and wireless local area networks (LANs), wired and/or wireless wide area networks (WANs), system area networks (SANs), campus area networks (CANs), and so forth.

As shown, the contact-center infrastructure 102 may include a contact-center interface 116 that facilitates and distributes the communication sessions 108. The contact-center interface 116 may provide application programming interfaces (APIs) and/or other portals that receive the communication session requests from user devices 106 and/or agent devices 114. The contact-center interface 116 may then distribute calls or other communication sessions to agent devices 114 based on which agent devices 114 are operated by available agents 112. In some instances, the contact-center interface 116 may include or provide a queue in which incoming communication sessions 108 are queued until agents 112 are available to handle the communication session 108 and the user 104 on the other end.

The contact-center infrastructure 102 may include or support an agent-assist system 118 that provides supplemental information to agents 112 during real-time, live communications sessions 108 with users 104 (e.g., customers). As described more in FIG. 2, the agent-assist system 118 may include, manage, or have access to one or more knowledge bases that include content which is useful for the agents 112 to use when answering questions or handling issues for users 104. The knowledge bases may include different documents or other sources of information that are relevant to different domains. The agent-assist system 118 may analyze text of the conversation if the conversation is message based, and/or include a speech-to-text component that converts a phone conversation to text. The agent-assist system 118 may analyze the text of the communication sessions 108 and determine context of the conversation, such as a semantic or meaning of the conversation. The agent-assist system 118 may then determine what topics in the knowledge base are relevant to the context or semantic of the conversation. Further, the agent-assist system 118 may determine queries or questions from the users 104 and determine documents from the knowledge bases that are semantically related to the query of the user 104. The agent-assist system 118 may then surface those documents for the agent 112 to use to respond to the queries. In this way, the agent-assist system 118 may provide relevant documents or material to the agents 112 while the agents 112 are in a conversation with the user 104.

However, the documents or materials provided to the agents 112 may be dense or otherwise include a lot of information. While this is helpful in that there is a lot of information provided to the agents 112 that they can use to respond to the users 104, it can take a lot of time for the agents 112 to sift through all the information and find portions of the documents that are relevant and most helpful for responding to the users 104. Accordingly, the techniques described herein include identifying portions of the documents, or "subdocuments," that are more relevant to the queries or context of the conversation between the agents 112 and user 104. The agent-assist system 118 may identify subdocuments from the documents and highlight or otherwise visually indicate the subdocuments as being more relevant to the query. As shown, an agent device 114 may present the conversation 120 being had between a user 104 and an agent 112. The conversation 120 illustrates that the user 104 has a question regarding their insurance policy being applicable for a new car that they bought. The agent-assist system 118 may determine the semantics or meaning of the query/questions, and identify documents that are indexed in the knowledge base as being related to the topic of the conversation 120 (e.g., car insurance policies).

The agent-assist system 118 may then determine what subdocuments from those documents are semantically related to the meaning of the query. The agent-assist system 118 may then cause an agent-assist client running on the agent device 114 to present the documents, and to visually highlight or indicate the subdocuments that have been determined to be semantically related or relevant to the query. Generally, the agent-assist system 118 may include or be associated with agent-assist clients or software running on the agent devices 114, and may visually indicate the subdocuments. For instance, the agent-assist system 118 may cause the subdocuments to be highlighted, underlined, have arrows pointing to it, bolded, and/or use any type of visual indicator or combination of visual indicators to distinguish the subdocuments from the remainder of the documents. In this way, the agent-assist system 118 may present documents and highlight subdocuments to help agents 112 quickly identify the relevant content of the documents. As shown, agent-assist recommendations 112 include multiple documents being presented and the subdocuments are highlighted to illustrate the subdocuments as being relevant to the query. The agent 112 can then quickly identify the relevant subdocuments and determine whether to use the subdocuments when answering the user 104.

In some instances, the agent-assist system 118 may collect feedback from the agents 112 and/or users 104 to determine whether the subdocuments were relevant, and to improve the recommendations 122 provided to the agents 112. For instance, the agent-assist system 118 may simply obtain explicit feedback from the agent 112 to determine whether the subdocument was relevant to the query. As illustrated, the agent 112 can simply click a thumbs up or thumbs down mechanism to indicate whether subdocuments were helpful or relevant to the query. In some instances, the agent-assist system 118 may collect implicit feedback from the agent 112 and/or user 104. For instance, the agent-assist system 118 may determine whether the answer provided by the agent 112 to the user 104 includes text that is similar to, or the same as, the subdocuments presented to the agent 112. As another example, the agent-assist system 118 may determine what subdocuments were in the viewport of the agent 112, and for how long, when the agent 112 provided answers to the users 104. As a further example, the agent-assist system 118 may determine a sentiment of the user 104 and/or agent 112 during the conversation. For instance, the agent-assist system 118 may perform sentiment analysis on the communication sessions 108 to determine a sentiment of the user 104 before and after receiving the answer from the agent 112. If the user's 104 sentiment increases after receiving the answer (e.g., "thank you!" or "that was very helpful!"), then the agent-assist system 118 may determine that the subdocument was relevant to the user's 104 query, and vice-versa if the sentiment decreases. The agent-assist system 118 may then increase or decrease confidence values associated with the subdocuments as being relevant to queries. Subdocuments that are determined to be relevant to queries can be moved up in the listing of subdocuments that are helpful for responding to users 104, and subdocuments that are determined to not be helpful or relevant to queries can be moved down the listing of subdocuments that are relevant to queries.

The contact-center infrastructure 102 may at least partly support the agent-assist system 118. The contact-center infrastructure 102 and the agent-assist system 118 may include servers, agent devices 114, network devices, and/or any other type or combination of devices. The agent-assist system 118 may include software running on the contact-center infrastructure 102, and also agent-assist software running on the agent devices 114. The contact-center infrastructure 102 and the agent-assist system 118 may include one or more hardware processors (processors), one or more devices, configured to execute one or more stored instructions. The processor(s) may comprise one or more cores. Further, the contact-center infrastructure 102 and the agent-assist system 118 may include one or more network interfaces configured to provide communications between the user devices 104 and the agent devices 114, and/or other systems or devices. The network interfaces may include devices configured to couple to personal area networks (PANs), wired and wireless local area networks (LANs), wired and wide area networks (WANs), and so forth. For example, the network interfaces 204 may include devices compatible with Ethernet, Wi-Fi, and so forth.

The contact-center infrastructure 102 and the agent-assist system 118 may also include computer-readable media that stores various executable components (e.g., software-based components, firmware-based components, etc.). In addition to various components discussed in FIG. 1, the computer-readable-media may further store components to implement functionality described herein. While not illustrated, the computer-readable media may store one or more operating systems utilized to control the operation of the one or more devices that comprise the contact-center infrastructure 102 and the agent-assist system 118. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 2:
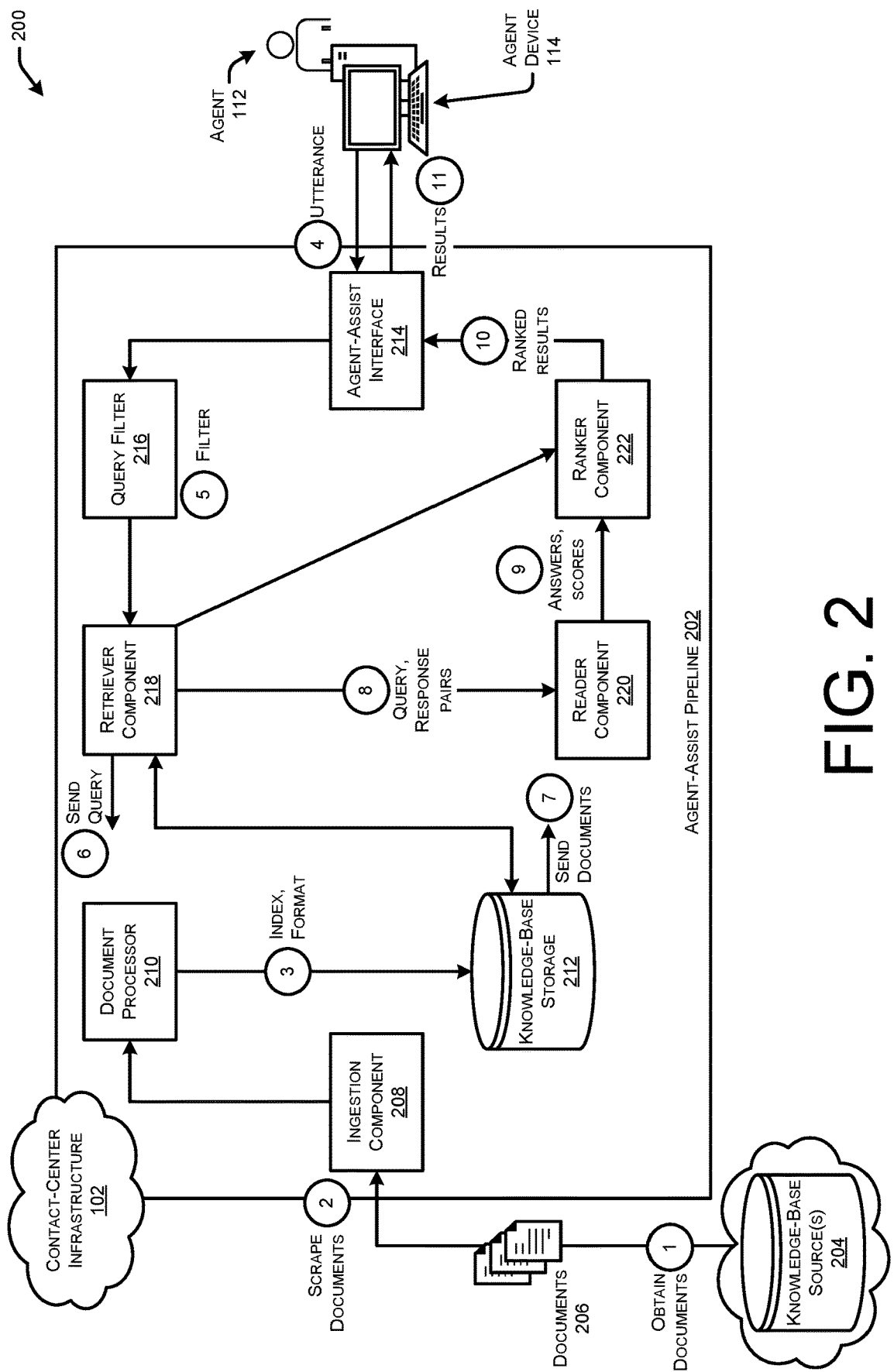
FIG. 2 illustrates an example system-architecture diagram of an agent-assist pipeline that provides recommended answers to an agent device for an agent to use when responding to a query of a user.

FIG. 2 illustrates an example system-architecture diagram 200 of an agent-assist pipeline 202 that provides recommended answers 122 to an agent device 114 for an agent 112 to use when responding to a query of a user 104. As illustrated, the agent-assist pipeline 202 may be supported at least partially by the contact-center infrastructure 102.

The agent-assist system 118 may include or support the components and operations of the agent-assist pipeline 202. The agent-assist system 118 may be configured to help agents 112 while handling user 104 interactions by recommending resources that are relevant to a user's 104 issue or question. Goals of the agent-assist system 118 may include decreasing the average handling time (AHT), increasing the first-contact resolution (FCR) rate, minimizing agent 112 training time, and to provide a fast and accurate source of information to agents 112 (among other potential applications such as surfacing relevant documents during a meeting/conference call or customer-facing question-answering chatbots).

To accomplish this, the agent-assist pipeline 202 may leverage information from an ongoing conversation, which is segmented into short phrases (utterances, spoken or typed), and uses each utterance to query a collection of one or more knowledge-base sources 204 containing domain-specific articles and help resources. The retrieved matches are then fed a machine reading comprehension (reader) system, which extracts a minimal recommendation for the agent 112 that most pertains to the user's 104 query; alternatively, a generative model generates a minimal recommendation text to show.

As shown in FIG. 2, the agent-assist pipeline 202 may obtain, at "1," documents 206 from the knowledge-base source(s) 204. The knowledge-base source(s) 204 may be Internet or web sources, online databases, publications or articles, and/or any type of document service or source. The documents may be text documents, FAQ webpages, PDFs, and/or any type of electronic document with information. An ingestion component 208 of the agent-assist pipeline 202 may, at "2," scrape the documents 206. Generally, scraping may include reading or collecting text data from the documents. For instance, scraping may include converting the documents 206 into files from which text can be collected or analyzed, or otherwise pulling data from the documents 206.

The ingestion component 208 may ingest the documents 206 received from the knowledge-base source(s) 204, and the ingestion component 208 may work with the document processor 210 to index and format the documents 206 at "3." For instance, the ingestion component 208 and/or the document processor 210 may ingest and index the documents 206 from knowledge base source(s) 204 (text documents, FAQ webpages, PDFs, etc.) that are grouped into profiles Generally, ingestion breaks down a document 206 into subdocuments using signals from the source document; for example, an HTML document contains boundary markup for sections, headers, paragraphs, lists, etc. Other signals include topic-drift measures, length of buffer of text being read so far, etc. The document processor 210 performs techniques to break down (using topic drift among other signals), transform, and index a collection contact-center knowledge base documents 206 into subdocuments represented by embeddings (points in a high-dimensional vector space) to enable semantic approximate nearest neighbor (ANN) search for a given query (a turn/utterance of a contact-center conversation).

At "3," the document processor 210 indexes each sub-document and its embedding representation into knowledge-base storage 212 (a fixed-length vector semantic representation that makes it easier to perform further processing). Embeddings, their respective text and metadata, and other data can be indexed using an indexing service Elasticsearch), Hierarchical Navigable Small World graphs, any system that supports Approximate Nearest Neighbor (ANN) search, or exhaustive (brute-force) search, etc. Subdocunient embeddings capture semantics (meaning) proximity as a distance function of the embedded subdocuments (and any embedded query as well) such that embeddings closer to each other in the vector space have similar meaning (high relevance) and ones far apart have different meaning (less relevance); the semantic relationship can hold across languages as well (for example, a query in English can match a subdocument in Arabic) when the embedding model is trained to do so. The embeddings also allow for arithmetic operations among other applications.

To determine the cutoff line for a subdocument, one of the signals used by the document processor 210 is topic drift; using a small, atomic unit that can indicate a topic (e.g., a sentence), each unit gets its own embedding. While processing units, an aggregate embedding representation for units seen so far is computed and compared to the embedding of the next unit (using a similarity measure like cosine similarity). If the similarity is above a certain threshold, the next unit is appended to the subdocument (given other constraints like maximum length, which is typically determined by the maximum input size for an embedding model, etc.); otherwise, a new subdocument is started and the process continues until the end of the current document being processed.

In some instances, the document processor 210 may aggregate embeddings for a collection of typically, but not necessarily, contiguous and/or similar subdocuments into a single embedding. The reader component 220 then contributes to refining the retrieved matches. Standard functions to aggregate embeddings include averaging and component-wise maximum. The document processor 210 may perform these techniques to reduce the search space (saving time and memory) by using an embedding to point to a collection of related/similar subdocwnents (rather than an embedding for each)—coalescing. The document processor 210 then relies on the rest of the pipeline 202 to perform a more refined search given the list of retrieved matches.

In this way, the knowledge-base storage 212 stores an index of each subdocument and its embedding representation (a fixed-length vector semantic representation that makes it easier to perform further processing) where the embeddings, their respective text and metadata and other data can be indexed using an indexing service (e.g., Elasticsearch), Hierarchical Navigable Small World graphs, any system that supports Approximate Nearest Neighbor (ANN) search, or exhaustive (brute-force) search, etc.

Now, the agent-assist pipeline 202 may utilize the knowledge-base storage 212 to provide agents 112 with relevant subdocuments for responding to questions or inquiries of users 104. At "4," the agent 112 may receive an utterance from the user 104 and provide the utterance to the agent-assist pipeline 202. For instance, an agent-assist interface 214 may obtain the conversation between the user 104 and agent 112 in real-time/asynchronous/streaming mode (gRPC calls) or in synchronous/batch mode (gRPC or REST). For instance, the agent-assist interface 214 can obtain and transcribe voice input for each telephone call leg, and for text conversations, the agent-assist interface 214 can support raw text input as well (which can enable semantic search or customer-facing chat applications as well) besides the typical textual interactions in Contact Center (chat, email, IM, call transcript, etc.).

The agent-assist interface 214 may provide a textual representation of the conversation (e.g., query from user 104) to a query filter 216 that evaluates each input. At "5," the query filter 216 may evaluate each input unit (e.g., query) and filter out utterances/queries that are clearly irrelevant to the knowledge base profile.

For a number of reasons, it is advantageous to avoid passing irrelevant or uninformative queries through the rest of the agent-assist pipeline 202. For example, queries such as "how are you" and "thanks for your help" are neither relevant nor informative in the context of a customer/user support call. Not all queries from a conversation are going to yield helpful resources to the agent 112, contributing to noisy signal and decreasing the usefulness of the recommendations to the agent 112. If a high percentage of the recommendations are distracting (we notify the agent 112 of a new recommendation when the agent-assist client is active) or unhelpful, then the agent-assist pipeline 202 would be essentially training the agent 112 to simply ignore the solution altogether. Additionally, there is a significant time and computational cost to processing queries, retrieving subdocuments, passing them to reader (question-answering) models, etc.

The query filter 216 may filter out queries The query filter 216 may use approaches for query filtering including detecting whether a query is small talk (a binary classifier using an algorithm like Naive Bayes), and detecting whether a query is a question (whether it's interrogative, declarative, or imperative) such as by using lexical sequential and syntactic structural patterns and semantic representations. Additionally, the query filter 216 may use approaches such as detecting whether a query is relevant to given corpora (a knowledge base profile), such as by using word-based relevance (e.g., frequency, Log-Likelihood, TF-IDF, clustering-based relevance to words in given corpora) and sentence similarity threshold (e.g., using cosine similarity of sentence embeddings) with pre-computed cluster centroids (e.g, using k-means) of sentences in given corpora. Additionally, the query filter 216 may use approaches such as an ensemble (combinations using plurality voting, weighted average, etc.) of the approaches above.

In some instances, the query filter 216 may determine that queries are relevant, but that the agent-assist system 202 may not have any matches in the knowledge-base storage 212. In such examples, the query filter 216 mark the query with a tag indicating that there is a knowledge base improvement opportunity and report the query to knowledge-base profile administrators, who can then enrich the source of the knowledge-base storage 212 with relevant help resources (e.g., FAQ website) and enabling the system to match the newly added documents when a similar query is presented to the system. As an example, the query "what's your fax number" could be a frequent query asked during calls that has no matches, and the system administrators can then post the fax number on the company's website and add it to the knowledge base profile.

Additionally, system administrators can view filtered out queries and rectify mistakes made by the agent-assist system 118 (e.g., false negatives), which are then used by the system to learn automatically and self-improve (active learning). For example, "I've been waiting three weeks for Santa" could be filtered out by the system, but a system admin can override that behavior and the system will learn (after asking for similar queries) to map it to the closest cluster (which can be "delivery issues").

After the query filter 216 filters out irrelevant queries or input from the user 104, a retriever component 218 may send queries at "6" to the knowledge-base storage 212 to identify relevant documents. That is, for each query that passes through the query filter 216, the retriever component 218 may embed the query using an embedding model (that preserves the semantic relationships detailed earlier) into a vector q, and searches the vector space index that corresponds to the agent's 112 knowledge base profile. An agent 112 handling a user conversation can be assigned to a single profile at a time. Each subdocument in the knowledge base profile, with references to the document to which it belongs, is represented as a point in the high-dimensional vector space (e.g., 1024 dimensions). The agent-assist system 118 finds the k nearest points, embedded using the same embedding model, to the input q. The cosine similarity measure is used to rank and score the top-k candidate matches. The cosine similarity of two vectors A and B is defined as the following:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}},$$

Additionally, the retriever component 218 may use a threshoiding mechanism to return high-confidence results, such as the pruning matches whose scores are below a certain mark (e.g., mean + one standard deviation). Alternatively, the retriever component 218 may make use of the Non-Metric Space Library (NMSL). Generally, NMSLIB provides a fast similarity search. The search is carried out in a finite database of objects $\{o_i\}$ using a search query q and a dissimilarity measure. An object is a synonym for a data point or simply a point. The dissimilarity measure is typically represented by a distance function $d(o_i, q)$. The ultimate goal is to answer a query by retrieving a subset of database objects sufficiently similar to the query q. A combination of data points and the distance function is called a search space, or simply a space.

The retriever component 218 typically considers two retrieval tasks: a nearest-neighbor and a range search. In the nearest-neighbor search, the retriever component 218 aims to find the object at the smallest distance from the quem. Its direct generalization is the k nearest-neighbor search (the k-NN search), which looks for the k closest objects, which have k smallest distance values to the query q. In generic spaces, the distance is not necessarily symmetric. Thus, two types of queries can be considered. In a left query, the object is the left argument of the distance function, while the query is the right argument. In a right query, the query q is the first argument and the object is the second, i.e., the right, argument. The queries can be answered either exactly, i.e., by returning a complete result set that does not contain erroneous elements, or, approximately, e.g., by finding only some neighbors. Thus, the methods are evaluated in terms of efficiency-effectiveness trade-offs rather than merely in terms of their efficiency. One common effectiveness metric is recall, which is computed as an average fraction of true neighbors returned by the method (with ties broken arbitrarily).

In addition to finding approximate nearest neighbors (ANN) for an arbitrary embedding q, which is useful for a single-shot query, the retriever component 218 may perform a conversation-context-aware vector ANN search. The AAN search may be helpful for disambiguation; for example, a quely like "what's the interest rate" would benefit from a prior query like "it's a car loan" to recommend results for interest rates of car loans rather than home loans (which are also relevant given the current query in isolation).

Generally, the retriever component 218 may utilize the arithmetic properties of embeddings to "nudge" the current query towards the direction of the conversation's history such that the closer in order of events a query is, the stronger the nudge gets. This can be accomplished with other arithmetic operations. The retriever component 218 may obtain a conversation-context-aware query embedding, given the conversation so far. The general form is: $q'=f(q_0, q_1, q_2, \ldots, q_t)$ such that $f$ maps a non-empty list of points in a high-dimensional vector space to a point in said space.

Optionally, the retriever component 218 may perform full-text search in tandem; including algorithms like TF-IDF, BM25, custom Elasticsearch queries, fuzziness, multi-terms synonym expansion, etc. Standard text search techniques include preprocessing steps like stop-word removal, stripping punctuation, tokenization, stemming (or lemmatization), etc. Any existing system that performs text search and returns a score for each match can be combined with the one above with a coefficient (weight) to combine the two approaches. The retriever component 218 may utilize a classical full-text match query system in combination with the embedding-based approach detailed above, taking a more-matches-is-better approach, so that the normalized scores for each match are aggregated with a coefficient for each model (classical and embedding-based); the default score for a missing match is 0. The matches are then sorted given the combined scores and the same thresholding techniques detailed above are performed.

At "8," the retriever component 218 then feeds the top matches to the reader component 220, and the reader component 220 may be a machine reading comprehension model to extract the minimal relevant span of text in each subdocument to highlight for the agents 112 and/or use in the push notifications they receive for recommendations. The reader component 220 may use question-answering models (e.g., models based on Stanford Question Answering Dataset models). Such models also produce a confidence score of how well they answered a given query given a subdocument that may contain the answer (or indicate that the query is unanswerable given the subdocument). The reader component 220 can aggregate the score as well into the final score for each match, with its own coefficient; rescore, rerank, and apply thresholds, then return the matches.

In some instances, rather than waiting on the results of the reader component 220 to return the list of matches with highlights, the system 118 may return the matches right after the first rescoring and re-ranking (using only cosine similarity score of embeddin.gs and classical text match score); the orchestrator service that manages the workflow would send the matches the reader component 220 to work on them asynchronously. Meanwhile, the UI is not waiting on the time-consuming reader subsystem; it gets back the results— without highlights of the minimal text spans—and renders them. Once the reader component 220 outputs the highlights, the orchestrator sends a message to the client (UI) with each subdocument's ID and its corresponding highlights (an array of pairs of start and end indices for the spans to highlight). This parallelizes the workloads of the UI rendering the matches and the reader model extracting highlights.

The ranker component 222 may receive the answers and scores at "9," and send the ranked results to the agent-assist interface 214 at "10." Generally, the agent-assist interface 214 may present the documents and subdocuments on the display of the agent device 114, such as in a UI presented by agent-assist software, such that the subdocument is highlighted or otherwise visually indicated on the agent device 114 display.

As describes herein, each contact-center queue of the agent-assist pipeline 202 (group of agents 112) is assigned a profile. Each profile belongs to an organization (tenant); each knowledge base contains a collection of documents; each document is a collection of subdocuments. A subdocument can be a paragraph in a document, a unit smaller than a paragraph (e,g., a sentence or a collection of contiguous sentences), or a collection of contiguous paragraphs.

Figure 3:
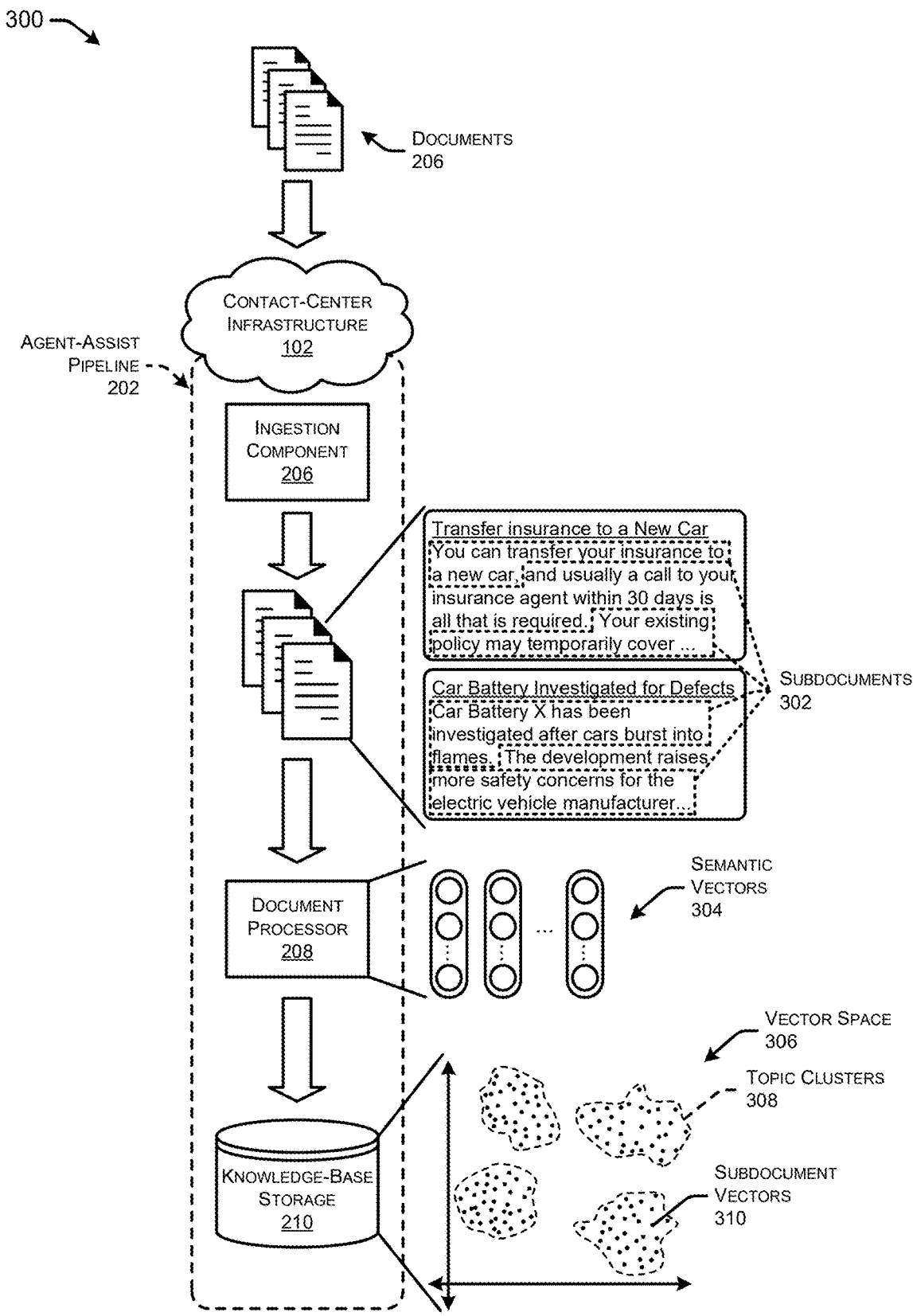
FIG. 3 illustrates an example flow diagram according to which an agent-assist pipeline extracts subdocuments from a plurality of documents, represents the subdocuments as semantic vectors, and creates a vector space with the semantic vectors.

FIG. 3 illustrates an example flow diagram 300 according to which an agent-assist pipeline 202 extracts subdocuments from a plurality of documents, represents the subdocuments as semantic vectors, and creates a vector space with the semantic vectors.

As illustrated, the ingestion component 206 may ingest the documents 206 and the document processor 210 may identify subdocuments 302 from the documents 206. The document processor 208 may then convert the subdocuments 302 into semantic vectors 304, or mathematical representation of the semantic meanings of the subdocuments 302. The document processor 208 may then format and index the semantic vectors 304 in a vector space 306 of the knowledge-base storage 210. As shown, the vector space 306 may have topic clusters 308 which are clusters of semantic vectors 304 representing the subdocument vectors 310. In this way, the queries received from users 104 can be embedded and represented as a vector 304, and then distances between the query vectors and stored subdocument vectors 310 to determine relevant subdocuments for the queries (e.g., semantic similarity).

Figure 4A:
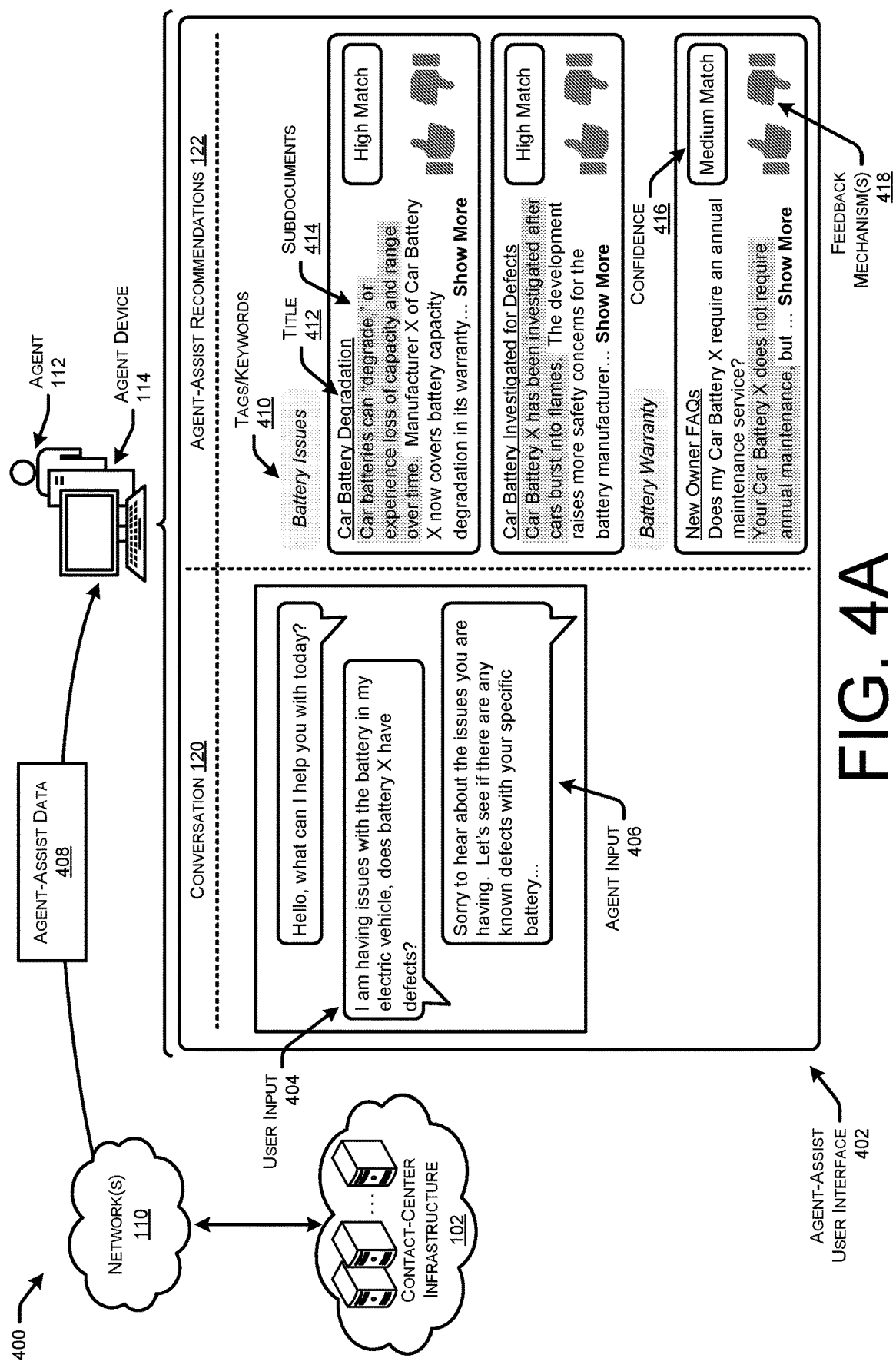
FIG. 4A illustrates a graphical user interface through which an agent is presented with recommended answers from an agent-assist system, and is able to identify relevant answers at subdocument granularity for responding to a query of a user.

FIG. 4A illustrates a graphical user interface through which an agent 112 is presented with recommended answers from an agent-assist system, and is able to quickly identify relevant answers at subdocument granularity for responding to a query of a user 104.

The agent-assist user interface (UI) 402 may present a conversation 120 between a user 104 and an agent 112 as well as agent-assist recommendations 122 for the agent 112 to use to respond to the user 104. As shown, the conversation 120 includes user input 404 and agent input 406 indicating what the agent 112 has said. The agent-assist system 118 may analyze the user input 404 using the agent-assist pipeline 202, and the agent-assist system 118 may provide agent-assist data 408 to the agent device 114. For instance, the agent-assist system 118 may be running agent-assist software which provides the user input 404 to the agent-assist pipeline 202. The agent-assist pipeline 202 may analyze the user input 404 and determine what documents and subdocuments are most relevant for responding to the query of the user 104. In this case, the user 104 is having issues with the battery in the electric vehicle.

The agent-assist system 118 then provide agent-assist data 408 to the agent device 114, and the agent-assist data 408 may indicate recommended answers (e.g., subdocuments), as well as other information associated with the conversation 120 and/or user input 404. For instance, the agent-assist recommendations 112 portion of the agent-assist UI 402 may indicate tags/keywords 410 indicating a context of the conversation and/or user input 404. The UI 402 may further indicate a title 412 of the document, and highlight (or otherwise visually indicate) the subdocuments 414. Generally, the relevant subdocuments may be highlighted or otherwise distinguishes the relevant subdocument from the rest of the document. Additionally, the UI 504 may indicate confidence values 416 indicating how confident the agent-assist system 118 is about the recommended document and/or subdocument 414.

In some instances, the UI 402 may further include feedback mechanisms through which the agent 112 can provide explicit feedback indicating a relevancy of the documents/subdocuments 414. In addition to like/dislike feedback mechanisms 418, other explicit feedback can be obtained. Additionally, the agent-assist system 118 can obtain or collect implicit feedback indicating a relevancy of the document/subdocument 414 for answering the query of the user 104.

Figure 4B:
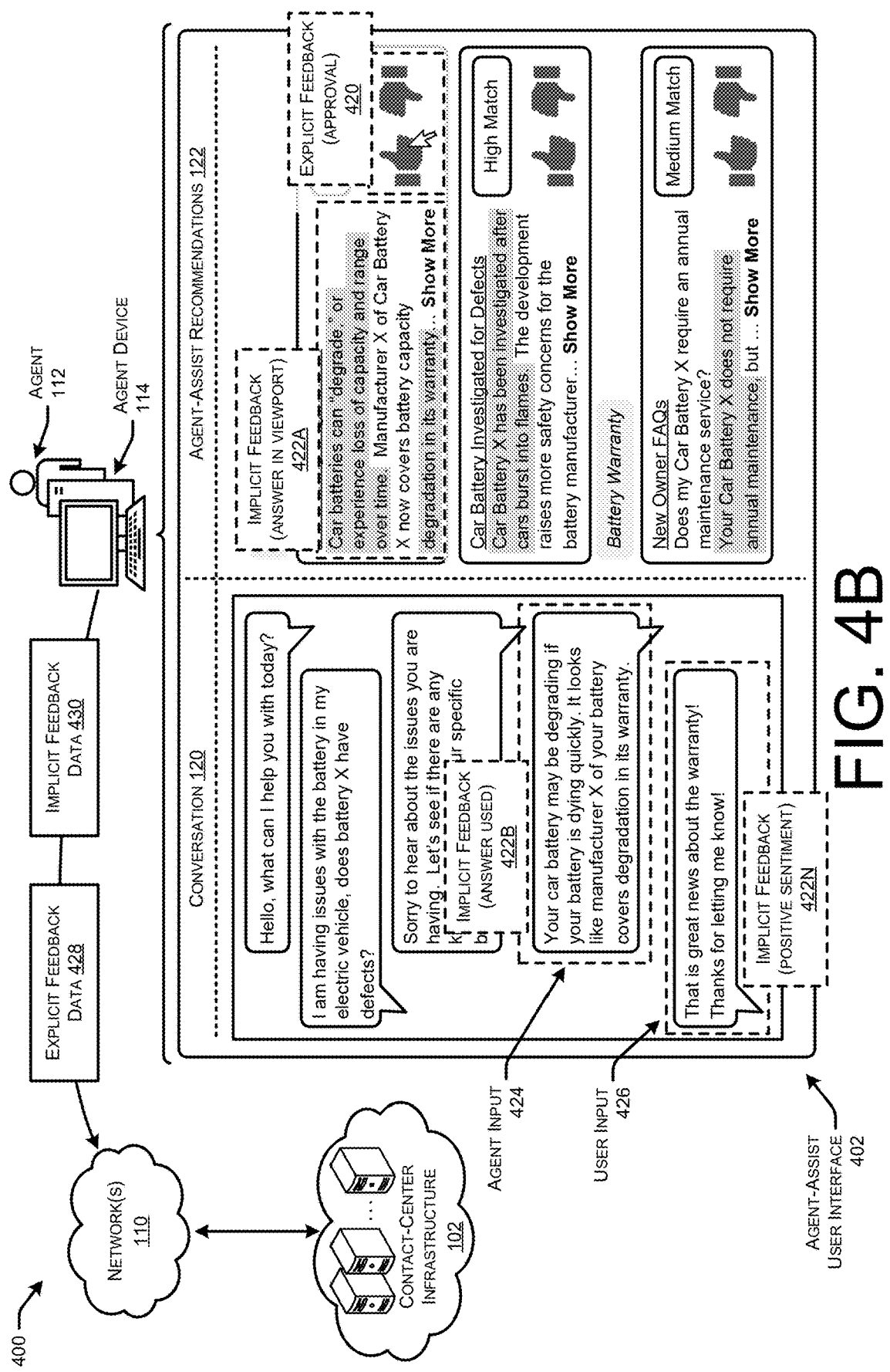
FIG. 4B illustrates a graphical user interface through which an agent views recommended answers provided by an agent-assist system, and provides explicit and/or implicit feedback regarding the relevancy of the recommended answers for responding to a query of a user.

FIG. 4B illustrates a graphical user interface 402 through which an agent 112 views recommended answers provided by an agent-assist system 118, and provides explicit and/or implicit feedback regarding the relevancy of recommended answers for responding to a query of a user 104.

As shown, the agent 112 may utilize the like/dislike buttons to provide explicit feedback 420. Thus, explicit feedback 420 may include a binary rating mechanism known as like/dislike (or thumbs-up for positive feedback and thumbs-down for negative feedback). The agent-assist system 118 allows the agent 112 to indicate whether or not a recommendation was relevant to the given query (current utterance for example). The feedback is then communicated to a server that stores the current query, recommendation, feedback, user (agent) ID, and other metadata (timestamp, etc.) so that other systems can learn from such feedback to boost or penalize recommendations based on the given feedback among other criteria.

Other types of explicit feedback may include the agent 112 reporting, such as through a report button, that the document/subdocument in the recommendations 122 is relevant, or is irrelevant. In some instances, clicking the report button may mark the recommendation for further input by the agent 112 after the session so that the conversation 120 is not interrupted. A list of reported recommendations are then shown as part of the post-interaction flow (which typically includes agent's wrap-up notes, reason for support case, etc.) with more options to report (incorrect, already learned, etc.); optionally, the agent 112 can provide a free-form written explanation as well for admin/supervisor reviewing the reported recommendations later, which can be useful in improving knowledge bases as well as the recommender system. When this button is shown alongside the dislike button, it carries more weight (e.g., immediate effect of hiding the recommendation to all or a subset of agents); compared to the dislike button which can be used to discount/demote the recommendation gradually.

Additionally, explicit feedback may include determining a click-through rate (CTR) of an agent 112. The event captured here is agent's 112 clicking a recommendation's link to get more details or read the entire help article. Repeated click events, by multiple unique or non-unique agents for the similar query-recommendation pairs, indicate that the respective recommendations were most probably relevant in solving the customer's issue and the agent 112 used the recommendation.

In addition to collecting explicit feedback, the agent-assist system 118 may collect implicit feedback based on utility of each recommendation according to the agent 112 and/or user 104. When the agent 112 uses one of the recent (within a window of some length N) recommendations, in a written or spoken form, the agent-assist system 118 records implicit positive feedback for the recommendation. Conversely, the agent-assist system 118 records implicit negative feedback for recommendations that are in the viewport (visible to the agent) yet not used. The weight for implicit feedback in the system may be equal to or less than that of explicit feedback for the purposes of biasing future recommendations given a similar query.

Further, the agent-assist system 118 may collect implicit feedback indicating a relevancy of a recommendation for responding to a query. For instance, the implicit feedback 422A may include an indication as to how long the recommended answer is in the viewport of the display of the agent device 114. The event captured at 422A is the time that agents 112 spend viewing a recommendation. A recommendation is considered "in view" when its area overlaps partially (above a certain threshold, 80% for example) or fully with the viewport (e.g., active area of web browser or application window). The time spent by agents 112 viewing each recommendation can thus computed using said logic.

To determine whether or not a recommendation is visible (in the viewport) while an agent 112 is using the agent-assist system 118, the agent-assist system 118 tracks agent 112 actions and system events (activating/deactivating the Agent Assist UI, UI focus/defocus and scrolling events, etc.) and correlates them with the time window of relevance of the current recommendation. A recommendation's time window of relevance is the period of time it is current (results for the current query); a recommendation's time window of relevance expires when a new set of recommendations (given a new query) has been presented to the agent 112.

Further, the implicit feedback 422B may include determining whether the answer was used. For instance, the agent-assist system 118 may compare agent input 424 with the recommended answers and determine if the agent input 424 is similar to (e.g., within some threshold similarity) a recommended answer presented. If the agent 112 does use a recommended answer, then the ranking of that answer for responding to the query can be increased because the recommended answer was used by the agent 112.

The agent-assist system 118 can track what agents 118 replied with and try to match with recent recommendations in the same interaction. Mismatched, yet viewed, recommendations may be penalized/discounted in the future given a requisite number of unique agents ignoring them. Matched, whether viewed or not, recommendations ay be boosted/promoted in the future given a requisite number of unique agents using them. Rescoring (boosting/discounting) is done for similar queries and history of recommendations (used/ignored, respectively) based on a matching set of criteria to determine similarity—i.e., both exact and fuzzy match techniques are used when determining query similarity and corresponding answers that were earlier used or ignored for a given input query.

The implicit feedback 422N captured may be the user's 104 overall sentiment trendline (either via survey in which the user 104 rates the interaction or automatically using a sentiment detection model). Generally, the trendline measure sentiment changes along the interaction; namely two points are key: towards the start and the end of interaction—other points include ones right after the agent has used (as defined below) a recommendation generated by the system.

Sentiment scores can be used as proxy for like/dislike signals described above. Sentiment analysis is done using both linguistic and paralinguistic (e.g., acoustic, tonal/prosodic) signals.

In order to measure the utility of a recommendation, the agent-assist system 118 may measure text similarity between each recent recommendation (in a window of length N) and text of each current agent turn in the conversation (e.g., utterance or reply). Relevant answers (ones with the highest utility) can vary in length (a word, phrase, sentence, paragraph, etc.) and may be highlighted by the reader component 220. Similarly, the agent 112 may respond in verbose manner, such that the utilized recommendation represents a part of the conversation turn (e.g., mentioned after repeating the customer's query and followed by an apology, all in the same utterance). One approach to determine the use of a recommendation in what the agent 112 responded with to the user 104 is to break down each recommendation into sentences (using a sentence tokenizer) and do the same to the agent's 112 response. Given the two set of sentences, the agent-assist system 118 may perform typical text preprocessing steps like removing sentences whose lengths are below a certain threshold L, removing stop-words (typically, words whose frequencies in some corpora are higher than a certain threshold W), discarding punctuation, case normalization, etc. The notation $S_r$ is used to indicate recommendation sentences, and $S_a$ is used to indicate agent 112 sentences. The agent-assist system 118 can find the set of pairs (matches) in the Cartesian product of $S_r \times S_a$ whose similarity scores are higher than a certain threshold M. The agent-assist system 118 may use methods to calculate text similarity scores; for example, cosine similarity: the cosine of the angle between two vectors (sentence embeddings) in a high-dimensional vector space. Another simple method is intersection-over-union (IoU) of words (tokens) in the pair of sentences (for each A in $S_a$ and B in $S_r$):

$$IoU = \frac{|A \cap B|}{|A \cup B|}$$

Generally, sentence-embedding methods capture semantic similarity between non-exact matches (different phrases and/or words whose meanings are similar) while IoU methods typically consider exact lexical matches (e.g., the words "NYC" and "New York City" don't match) unless a multi-term synonyms graph is used to test for exact and expanded list of terms for each input.

The agent-assist system 118 then records the set of matches for each recommendation, if any, to report later to users of the system (contact center agents, supervisors, analysts, admins, etc.) and for other systems to learn from the automatically labeled data potentially after validation and/or in tandem with other labeled data (semi-supervised learning). In addition to using the implicit feedback for query-match rescoring, validated (e.g., by a human-in-the-loop) customer-query-and-agent-answer pairs can serve as augmented data for the question-answer, reader component 220 in the agent-assist system 118.

Conversely, the agent-assist system 118 may record recommendations made visible to an agent 112 (in the viewport) a number of times without utilization (unmatched by the matching method above). When that number exceeds a certain threshold C (frequency and/or percentage of views), the agent-assist system 118 records implicit feedback for those recommendations.

In some instances, the agent-assist system 118 may personalize recommendations based on the agent 112 to which the recommendations are being presented. For instance, given matches collected by methods mentioned above, the agent-assist system 118 can infer whether or not an agent 112 has learned an answer for a given query. There are multiple factors that the system considers as signals that the agent learned or memorized an answer:

The agent's 112 response in the conversation matches, according to the matching methods mentioned above, one of the agent-assist system's 118 recommendations; this signal has more weight when the UI is not in the agent's 118 viewport (answer was matched even though the agent 118 can't read the recommendation).

The aforementioned matches occurred V times in a short time period P configured by the agent-assist system 118 (for example 10 times in the span of 4 hours).

Click-through (opening the linked document or help article) is considered a negative factor of learning (agent 118 still needs to learn more about the subject).

Explicit feedback mechanism (e.g., a button) for the agent 118 to indicate that the recommendation is relevant but unneeded since the agent 118 has learned it. Explicit feedback of a learned recommendation may have weight equal to or greater than implicit feedback according to agent-assist system 118 configuration; it also may be considered a strict rule to hide said recommendation effective immediately (contrast that with impression discounting below, which is gradual).

In some instances, the agent-assist system 118 may perform impression discounting to reduce the chances of the recommendation surfacing. For instance, whether a recommendation has been demoted by multiple agents 118 (e.g., using the dislike button) or has been learned by the agent 118 (for the given input query or ones that are similar to it), the agent-assist system 118 may apply a score-discounting technique to reduce the chances of the recommendation surfacing on top of more desirable ones (either by a specific agent or a group of agents). When the new computed score places the recommendation in a position lower than the top-K allowed to be shown to the agent, it effectively leads to hiding it (since it didn't make the cut).

In some instances, the agent-assist system 118 may improve the knowledge base by using "orphaned" queries. For example, queries may get filtered out early in the pipeline 202 when the query filter 216 deems them irrelevant to the domain of the knowledge base profile (collection on configured knowledge bases). Queries that make it through the query filter 216 in the agent-assist pipeline 202 are not guaranteed to produce recommendations since later stages in the agent-assist pipeline 202 produce more accurate results and hence may not match the query to a recommendation. That said, it's possible that a query makes it through the query filter 216 and doesn't match/cause the agent-assist system 118 to produce any recommendations because the ingested knowledge base profile is lacking content that's relevant to the query. One example of that can be a query filter model trained on queries of airline customer support calls allowing a query about seat change procedure to pass through; yet, the knowledge base profile is missing a document or subdocument that can be produced as a relevant recommendation. Missing relevant subdocuments could have been deleted, edited, or simply lacking from the get-go. These queries may be referred to as "orphaned" for brevity. Additionally, the agent-assist system 118 may utilize induced orphaned queries. For example, the query filter 216 for a health-related agent-assist system 118 can let COVIDrelated queries pass through the filter 216 but the rest of the pipeline 202 can't find a relevant match for them. Query filters 216 may be less accurate than the result of the pipeline 202; trained more frequently; and/or more general than the specific knowledge base profile to be search for matches (e.g., trained on queries relevant to the industry to which the knowledge base profile belongs instead of the profile per se).

In some examples, the agent-assist system 118 may keep track of orphaned queries (text and corresponding audio if available) and their metadata (timestamp, version of knowledge base profile at that time, version of software and models used for matching, etc.) and present a report to an admin of the knowledge-base profile with a suggestion to create a relevant document (which can also be published on a public website, leading to reduced contact volume thanks to self-service). Additionally, the agent-assist system 118 may produce a report of all queries, their metadata, and set of matches (empty and non-empty), with the option/selector to select orphaned queries. The agent-assist system 118 also has the option of reporting orphaned queries grouped by similarity (refer to text similarity scoring above.

Figure 5:
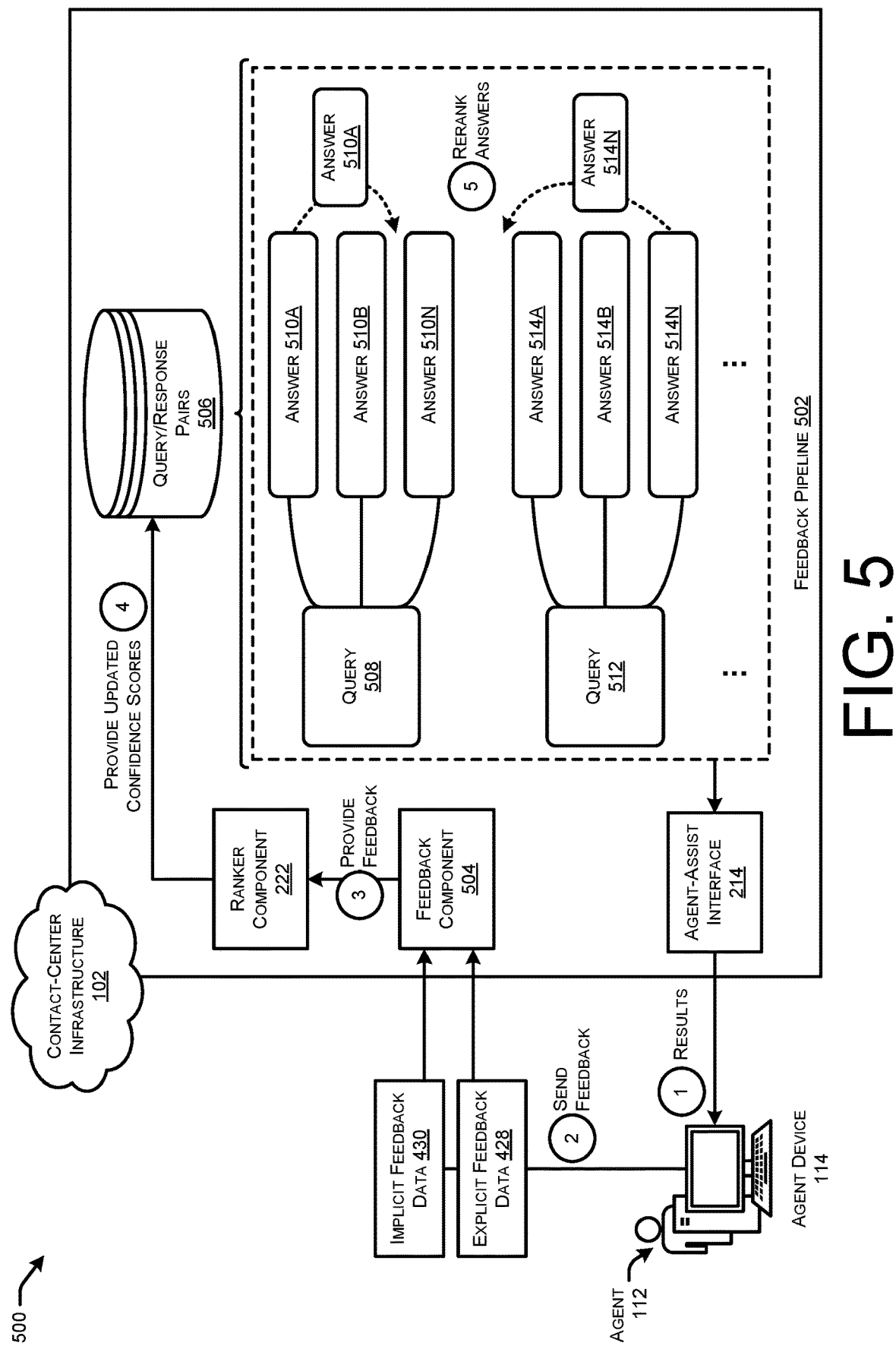
FIG. 5 illustrates an example system-architecture diagram of a feedback pipeline that receives feedback provided by an agent indicating a relevancy of recommended answers for responding to a query, and modifies rankings of the recommended answers based on the feedback.

FIG. 5 illustrates an example system-architecture diagram 500 of a feedback pipeline 502 that receives feedback provided by an agent 112 indicating a relevancy of recommended answers for responding to a query, and modifies rankings of the recommended answers based on the feedback. In some instances, the feedback pipeline 502 is included in, managed by, or otherwise associated with, the agent-assist system 118.

The agent-assist interface 414 may, at "1," provide results to the agent device 114 that include recommended answers for a query that was sent by a user 104. The results may include a list of answers which are ranked or presented based on confidence values indicating a likelihood that the results are relevant to the query. In some instances, the recommended answers that the agent-assist system 118 determines are more relevant to the query have higher confidence values and are presented higher on the list of results.

At "2," the agent device 114 may collect and send feedback data indicating how relevant the agent 112 and/or user 104 felt the results were for responding to the query using techniques as described above. The agent device may send one or more of explicit feedback data 428 or implicit feedback data 430 to a feedback component 504 of the feedback pipeline 502. The feedback component 504 collect feedback, and/or work in conjunction with agent-assist software running on the agent device 114, to collect feedback indicating a relevancy of the results for answering the query. At "3," the feedback component 504 will provide the feedback to the ranker component 222. Generally, the feedback will indicate whether the recommended answers were relevant or not for the query.

The ranker component 222 can then use the feedback to determine whether the confidence scores for the query-answer pairs need to be adjusted or updated. Generally, if the feedback indicates that the recommended answer was relevant for the query, the recommended answer may have its confidence score increased as being appropriate for the query (or at least stay the same). Conversely, if the feedback indicates that the recommended answer was irrelevant for the query, the confidence score for that recommended answer being useful for the query may be reduced (or remove the answer entirely from consideration). In some instances, if there is not feedback for an answer, then the confidence score for the answer may simply stay the same.

The updated confidence scores may then be used to adjust the ranking for query/response pairs 506. Generally, the query/response pairs 506 may store mappings or associations between queries 508, 512, etc., and answers 510, 514, etc., that were determined to be relevant or helpful for answering the queries 508/512. As shown, the updated confidence scores may result in answer 510A moving down the list or answers 510 due to the answer 510A being deemed as not relevant or helpful when responding to the query 508. In subsequent conversations, the answer 510A will not be presented first, or presented at all, for the agent 112 to use to respond to the query 508. As another example, answer 514N may be elevated in the list of answers 514 due to the feedback indicating that the answer 514N was helpful or relevant and the confidence score for the answer 514N being increased.

FIGS. 6, 7A, 7B, 8, and 9 illustrate flow diagrams of example methods 600, 700, 800, and 900 that illustrate aspects of the functions performed at least partly by the agent-assist system 118 as described in this disclosure. The logical operations described herein with respect to FIGS. 6, 7A, 7B, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6, 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The methods 600, 700, 800, and 900 may be performed by the agent-assist system 118. As noted above, the agent-assist system 118 may run at least partly in a cloud, data center, or other centralized environment, and may run at least partly on agent devices 114 as agent-assist software. That is, the operations of methods 600, 7000, 800, and 900 may be performed entirely by agent-assist software running on an agent device 114, entirely by a centralized (or distributed) agent-assist system 118 running on servers or other network devices, and/or a combination thereof.

Figure 6:
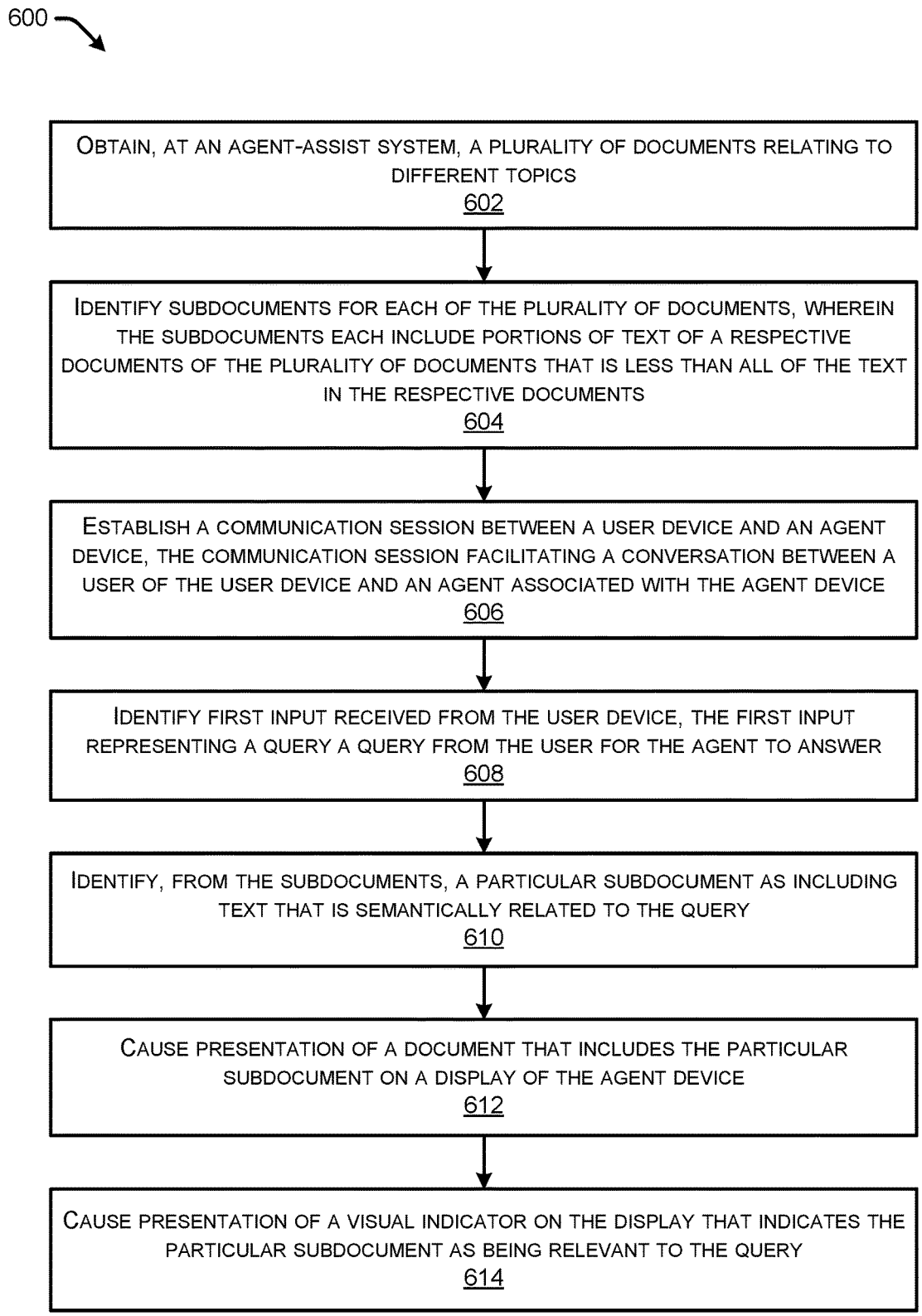
FIG. 6 illustrates a flow diagram of an example method for an agent-assist system to obtain collections of documents that include information for responding to queries, and provide subdocuments from the documents to an agent to use when responding to the queries.

FIG. 6 illustrates a flow diagram of an example method 600 for an agent-assist system 118 to obtain collections of documents 206 that include information for responding to queries, and provide subdocuments 302 from the documents 206 to an agent 112 to use when responding to the queries.

At 602, an agent-assist system 118 may obtain a plurality of documents 206 relating to different topics. For instance, the ingestion component 208 may collect and/or receive documents 206 from various knowledge-base sources 204.

At 604, the agent-assist system 118 may identify subdocuments 302 from each of the plurality of documents 206. Generally, the subdocuments 302 may each include portions of text of a respective document 206 of the plurality of documents 206 that is less than all of the text in the respective documents 206.

At 606, the agent-assist system 118 may establish a communication session 108 between a user device 106 and an agent device 114 where the communication session 108 facilitates a conversation between a user 104 of the user device 106 and an agent 112 associated with the agent device 114.

At 608, the agent-assist system 118 may identify first input received from the user device 106 where the first input represents a query of the user 104 for the agent 112 to answer. At 610, the agent-assist system 118 may identify, from the subdocuments 302, a first subdocument 302 as including first text that is semantically related to the query. For example, the agent-assist system 118 may generate an embedding representing the semantic meaning of the query, and identify subdocuments 302 having embeddings that are similar to (e.g., within a threshold distance in a vector space) the query embedding.

At 610, the agent-assist system 118 may cause presentation of a document that includes the first subdocument on a display of the agent device. For instance, the agent-assist system 118 may cause agent-assist software running on the agent device 114 to present the document 206 that includes the first subdocument 302.

At 612, the agent-assist system 118 may cause presentation of a visual indicator on the display that indicates the first subdocument 302 as being relevant to the query. Generally, the visual indicator can be any visual indicator that distinguishes the first text of the first subdocument relative to remaining text in the document (e.g., highlighting, underlining, bold, italics, arrows, bounding box, etc.).

Figure 7A:
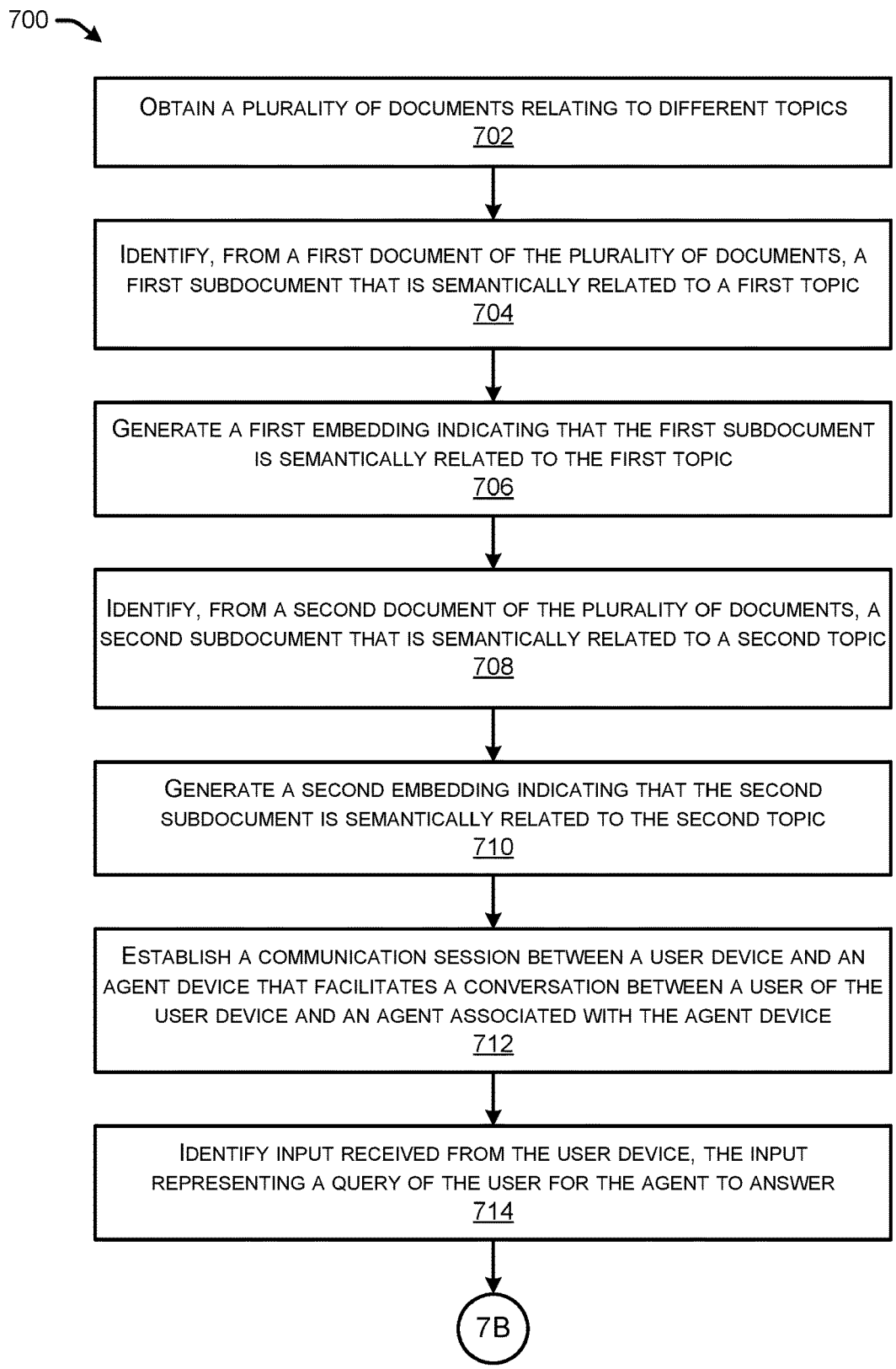
FIGS. 7A and 7B collectively illustrate a flow diagram of an example method for an agent-assist system to determine sematic meanings for subdocuments located in different documents, identify a meaning of input received from the user, determine which of the subdocuments is more similar to the meaning of the input, and cause presentation of the subdocument to an agent.
Figure 7B:
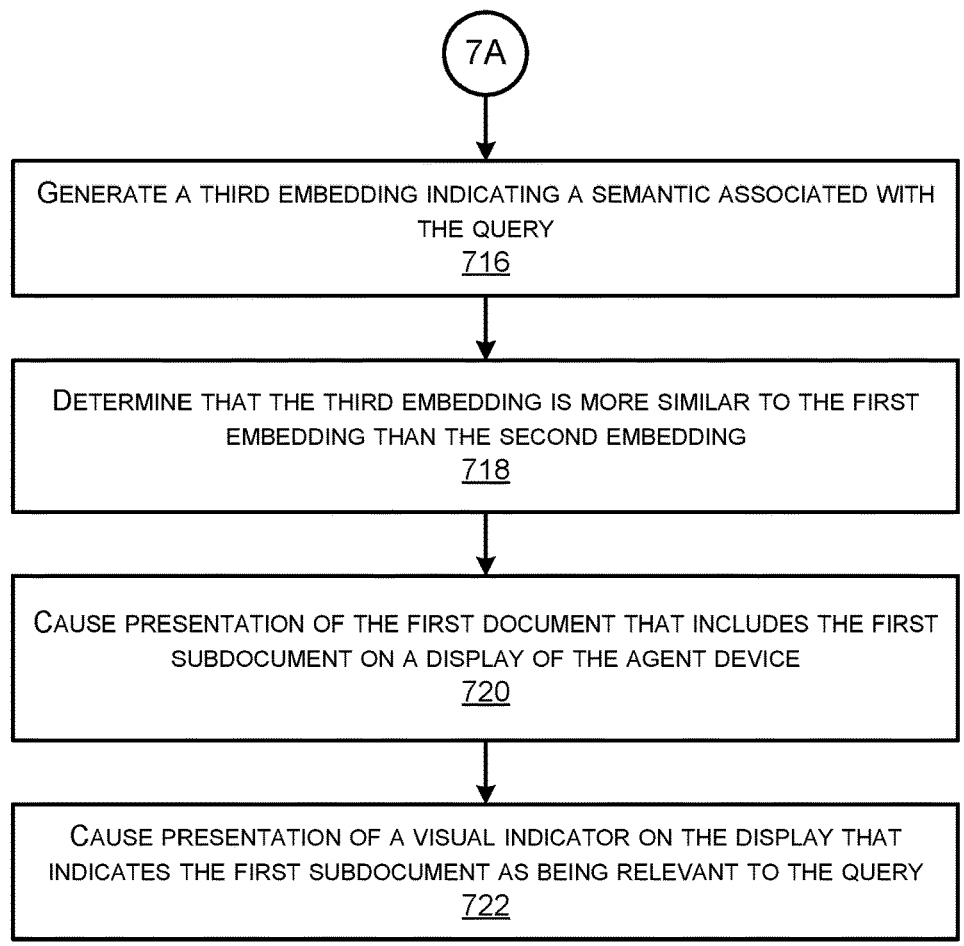

FIGS. 7A and 7B collectively illustrate a flow diagram of an example method 700 for an agent-assist system 118 to determine sematic meanings for subdocuments 302 located in different documents 206, identify a meaning of input received from the user 104, determine which of the subdocuments 302 is more similar to the meaning of the input, and cause presentation of the subdocument 302 to an agent 112.

At 702, an agent-assist system 118 may obtain a plurality of documents 206 relating to different topics. For instance, the ingestion component 208 may collect and/or receive documents 206 from various knowledge-base sources 204.

At 704, the agent-assist system 118 may identify, from a first document 206 of the plurality of documents 206, a first subdocument 302 that is semantically related to a first topic. Generally, the first subdocument 302 includes first text of the first document 206 that is less than all of the text of the first document 206.

At 706, the agent-assist system 118 may generate a first embedding indicating that the first subdocument is semantically related to the first topic. At 708, the agent-assist system 118 may identify, from a second document 206 of the plurality of documents 206, a second subdocument 302 that is semantically related to a second topic. Generally, the second subdocument 302 includes second text of the second document that is less than all of the text of the second document 206.

At 710, the agent-assist system 118 may generate a second embedding indicating that the second subdocument is semantically related to the second topic. At 712, the agent-assist system 118 may establish a communication session 108 between a user device 106 and an agent device 114 where the communication session 108 facilitates a conversation between a user 104 of the user device 106 and an agent 112 associated with the agent device 114.

At 714, the agent-assist system 118 may identify input received from the user device 106 where the first input represents a query of the user 104 for the agent 112 to answer. At 716, the agent-assist system 118 may generate a third embedding indicating a semantic associated with the query. That is, the third embedding may represent the semantic, or meaning, of the query.

At 718, the agent-assist system 118 may determine that the third embedding is more similar to the first embedding than the second embedding. For instance, a distance between the third embedding and the first embedding may be less than a distance between the third embedding and the second embedding.

At 720, the agent-assist system 118 may cause presentation of the first document 206 that includes the first subdocument 302 on a display of the agent device. For instance, the agent-assist system 118 may cause agent-assist software running on the agent device 114 to present the document 206 that includes the first subdocument 302.

At 722, the agent-assist system 118 may cause presentation of a visual indicator on the display that indicates the first subdocument 302 as being relevant to the query. Generally, the visual indicator can be any visual indicator that distinguishes the first text of the first subdocument relative to remaining text in the document (e.g., highlighting, underlining, bold, italics, arrows, bounding box, etc.).

Figure 8:
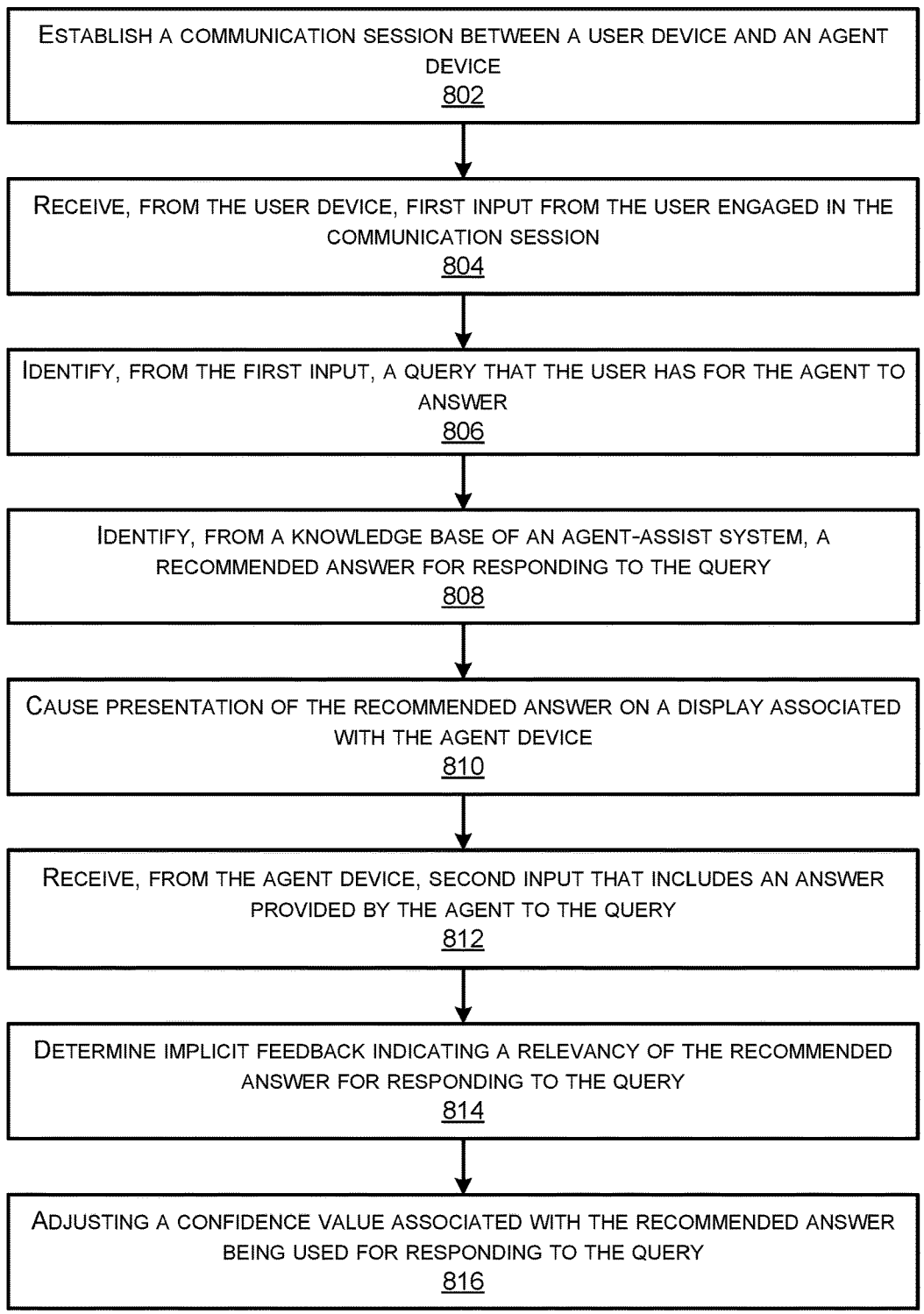
FIG. 8 illustrates a flow diagram of an example method for an agent-assist system to collect feedback from an agent and/or user to determine a relevancy of recommended answers that were presented to the agent.

FIG. 8 illustrates a flow diagram of an example method 800 for an agent-assist system 118 to collect feedback from an agent 112 and/or user to determine a relevancy of recommended answers that were presented to the agent 112.

At 802, an agent-assist system 118 may establish a communication session between a user device 106 and an agent device 114 where the communication session 108 facilitates a conversation between a user 104 of the user device 106 and an agent 112 associated with the agent device 114.

At 804, the agent-assist system 118 may receive, from the user device 104, first input from the user engaged in the communication session. At 806, the agent-assist system 118 may identify, from the first input, a query that the user 104 has for the agent 112 to answer.

At 808, the agent-assist system 118 may identify, from a knowledge base 212 of the agent-assist system 118, a recommended answer for responding to the query. At 810, the agent-assist system 118 may cause presentation of the recommended answer on a display associated with the agent device 112. At 812, the agent-assist system 118 may receive, from the agent device 112, second input that includes an answer provided by the agent to the query.

At 814, the agent-assist system 118 may determine implicit feedback indicating a relevancy of the recommended answer for responding to the query. The implicit feedback may be a time the answer was in the viewport of the agent device 112, an indication as to whether the answer was used by the agent 112, and/or sentiment analysis of the user 104 and/or agent 112.

At 816, the agent-assist system 118 may adjusting a confidence value associated with the recommended answer being used for responding to the query based at least in part on the implicit feedback. Generally, the confidence value indicates a likelihood that the recommended answer is relevant to use for responding to the query.

Figure 9:
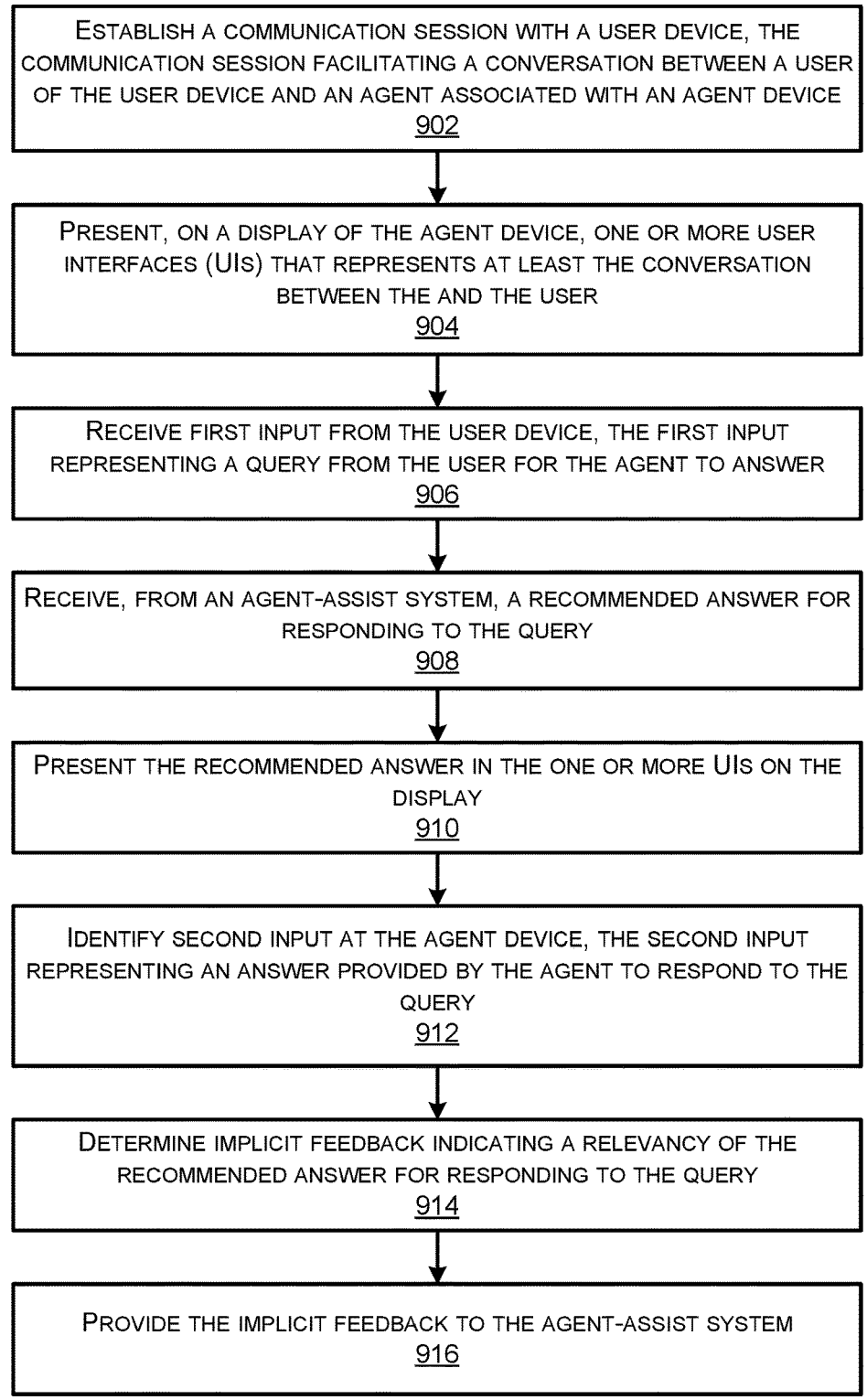
FIG. 9 illustrates a flow diagram of an example method for an agent device to collect feedback from an agent to determine a relevancy of recommended answers that were presented to the agent.

FIG. 9 illustrates a flow diagram of an example method 900 for an agent device 112 to collect feedback from an agent 112 to determine a relevancy of recommended answers that were presented to the agent 112.

At 902, an agent device 114 may establish a communication session 108 with a user device 106 where the communication session facilitates a conversation between a user 104 of the user device 106 and an agent 112 associated with the agent device 114.

At 904, the agent device 114 may present, on a display of the agent device 114, one or more user interfaces (UIs) that represents at least the conversation between the agent 112 and the user 104.

At 906, the agent device 114 may receive first input from the user device 106 (e.g., audio data, video data, text data, etc.), where the first input representing a query from the user 104 for the agent 112 to answer. At 908, the agent device 112 may receive a recommended answer from the agent-assist system 118 that is usable for responding to the query.

At 908, the agent device 114 may present the recommended answer in the one or more UIs on the display, and it may also present a visual indicator that highlights the recommended answer.

At 910, the agent device 114 may identify second input that represents an answer provided by the agent 112 to respond to the query. At 912, the agent device 114 may determine implicit feedback indicating a relevancy of the recommended answer for responding to the query. The implicit feedback may be a time the answer was in the viewport of the agent device 112, an indication as to whether the answer was used by the agent 112, and/or sentiment analysis of the user 104 and/or agent 112. At 912, the agent device 112 may provide, or send, the implicit feedback to the agent-assist system 118.

Figure 10:
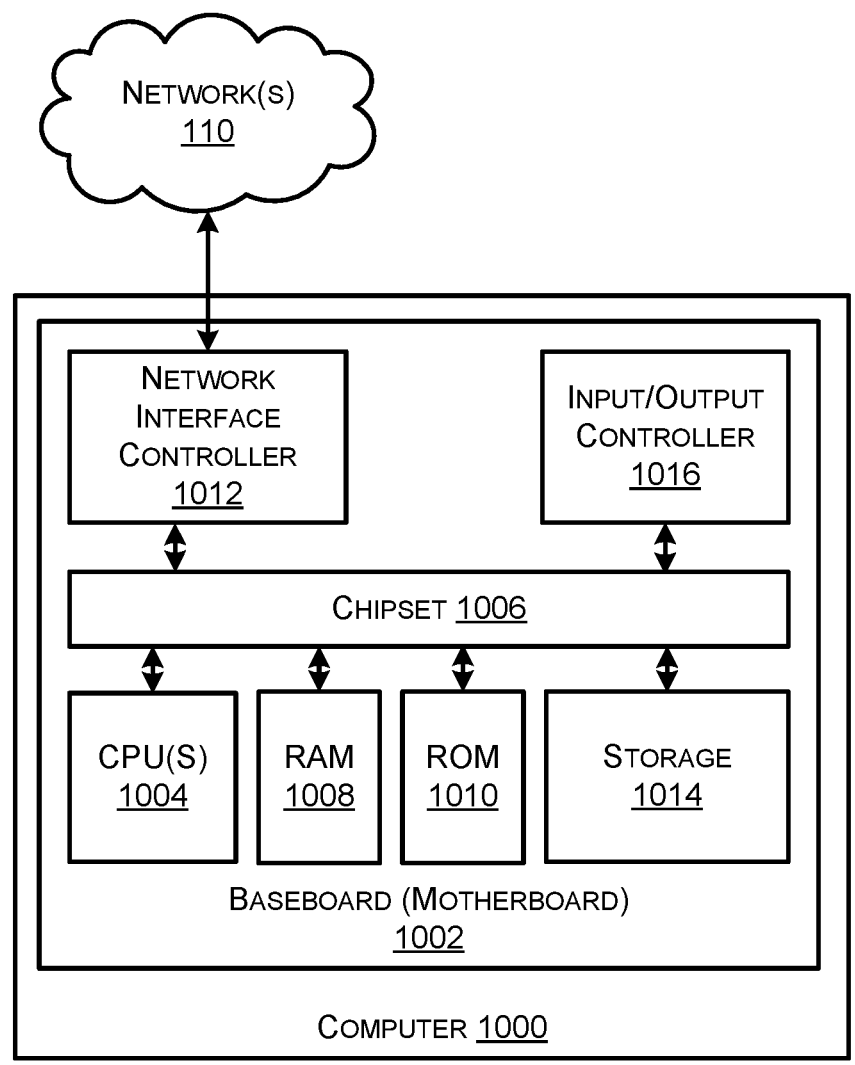
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described herein. The computer architecture shown in FIG. 10 illustrates a conventional server computer, workstation, desktop computer, laptop, tablet, network appliance, e-reader, smartphone, or other computing device, and can be utilized to execute any of the software components presented herein. In some examples, the computer 1000 may be part of a system of computers, such as the contact-center-infrastructure/system 102. In some instances, the computer 1000 may be an agent device 114 and perform the functionality described herein as being performed by the agent device 114.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 110. The chipset 1006 can include functionality for providing network connectivity through a network interface controller (NIC) 1012, such as a gigabit Ethernet adapter. The NIC 1012 is capable of connecting the computer 1000 to other computing devices over the network 110. It should be appreciated that multiple NICs 1012 can be present in the computer 1000, connecting the computer to other types of networks and remote computer systems.

The computer 1000 can include storage 1014 (e.g., disk) that provides non-volatile storage for the computer. The storage 1014 can consist of one or more physical storage units. The storage 1014 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage 1014 by detecting the physical states or characteristics of one or more particular locations within the physical storage units.

In addition to the storage 1014 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the contact-center infrastructure 102, and or any components included therein, may be supported by one or more devices similar to computer 1000. Stated otherwise, some or all of the operations performed by the contact-center infrastructure 102, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1014 can store an operating system utilized to control the operation of the computer 1000. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1014 can store other system or application programs and data utilized by the computer 1000.

In one embodiment, the storage 1014, RAM 1008, ROM 1010, and/or other computer-readable storage media may be encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various techniques described above. The computer 1000 can also include computer-readable storage media having instructions stored thereupon for performing any of the other computer-implemented operations described herein. In some instances, the computer 1000 may be an example of an agent device 114 described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by an agent-assist system, the method comprising:
    obtaining a plurality of documents at the agent-assist system, the plurality of documents including subdocuments;
    converting subdocuments into mathematical representations of semantic meanings of the subdocuments;
    storing the mathematical representations of the semantic meanings of the subdocuments in a knowledge base of the agent-assist system;
    establishing a communication session between a user device and an agent device, wherein the agent device presents supplemental information to an agent engaged in the communication session for responding to a user associated with the user device;
    receiving, from the user device, first input from the user engaged in the communication session;
    identifying, from the first input, a query that the user has for the agent to answer;
    retrieving, using a model trained on historical interactions, a recommended answer from the knowledge base of the agent-assist system, wherein the retrieving the recommended answer for responding to the query includes:
        identifying a prior query in the communication session that is related to the query;
        using a conversation-context-aware semantic search algorithm, ranking candidate answers from the model based on contextual similarity between the prior query and the query, wherein the candidate answers have corresponding mathematical representations determined to be mathematically similar to the prior query and the query;
    causing presentation of the recommended answer on a display associated with the agent device;
    receiving, from the agent device, second input that includes an answer provided by the agent to the query;
    determining, using automated data tracking techniques, implicit feedback indicating a relevancy of the recommended answer for responding to the query, the determining the implicit feedback includes determining (i) a duration the recommended answer remains in a viewport of the agent device, (ii) a modification made by the agent to the recommended answer before sending a response, and (iii) sentiment analysis of user responses following answer presentation; and
    based at least in part on the implicit feedback, adjusting a confidence value associated with the recommended answer being used for responding to the query, wherein the confidence value indicates a likelihood that the recommended answer is relevant to use for responding to the query, the adjusting the confidence value including decreasing the confidence value, wherein adjusting the confidence value includes dynamically updating the model to refine future recommendations and reducing presentation frequency for low-confidence answers.

2. The method of claim 1, wherein determining the implicit feedback includes:
    determining that the recommended answer was presented at least partially in the viewport of the display for a period of time; and
    determining whether the period of time was greater than or equal to a threshold period of time; and
    wherein adjusting the confidence value comprises:
    in response to determining that the period of time being greater than or equal to the threshold period of time, increasing the confidence value; or
    in response to determining that the period of time being less than the threshold period of time, decreasing the confidence value.

3. The method of claim 1, wherein determining the implicit feedback includes:

obtaining first text data representing the recommended answer;

obtaining second text data representing the answer;

determining a similarity score indicating a measure of similarity between the first text data and the second text data; and determining whether the similarity score is greater than or equal to a threshold similarity score; and wherein adjusting the confidence value comprises:

in response to determining that the similarity score is greater than or equal to the threshold similarity score, increasing the confidence value; or in response to determining that the similarity score is less than the threshold similarity score, decreasing the confidence value.

4. The method of claim 3, further comprising:

determining that the second input was received from the agent device within a threshold amount of conversation turns of the communication session; and determining to adjust the confidence value based at least in part on the second input being received within the threshold amount of conversation turns.

5. The method of claim 1, wherein determining the implicit feedback includes:

identifying, using a sentiment-analysis model of the agent-assist system, a first sentiment of the user prior to receiving the second input that includes the answer provided by the agent;

identifying, using the sentiment-analysis model, a second sentiment of the user subsequent to receiving the second input that includes the answer provided by the agent; and determining a sentiment change for the user using the first sentiment and the second sentiment, and wherein adjusting the confidence value comprises:

in response to determining that the sentiment change indicates the sentiment of the user has increased, increasing the confidence value; or in response to determining that the sentiment change indicates the sentiment of the user has decreased, decreasing the confidence value.

6. The method of claim 1, further comprising:

determining explicit feedback indicating relevancy of the recommended answer for responding to the query; and adjusting the confidence value based at least in part on the explicit feedback.

7. The method of claim 1, further comprising:

receiving third input from the user of the user device, the third input including a second query for the agent to answer;

determining that the knowledge base does not include recommended answers for the second query; and outputting, to an administrative account associated with the knowledge base, an indication that the knowledge base does not include recommended answers for the second query.

8. A system comprising:

one or more processors; and one or more computer-readable media storing computer-executable instructions that, when executed by the one or more processors, cause the one or more processors to perform operations comprising:

obtaining a plurality of documents at an agent-assist system, the plurality of documents including subdocuments;

converting subdocuments into mathematical representations of semantic meanings of the subdocuments;

storing the mathematical representations of the semantic meanings of the subdocuments in a knowledge base of the agent-assist system;

establishing a communication session between a user device and an agent device, wherein the agent device presents supplemental information to an agent engaged in the communication session for responding to a user associated with the user device;

receiving, from the user device, first input from the user engaged in the communication session;

identifying, from the first input, a query that the user has for the agent to answer;

retrieving, using a model trained on historical interactions, a recommended answer from the knowledge base of the agent-assist system, wherein the retrieving the recommended answer for responding to the query includes:

identifying a prior query in the communication session that is related to the query;

using a conversation-context-aware semantic search algorithm, ranking candidate answers from the model based on contextual similarity between the prior query and the query, wherein the candidate answers have corresponding mathematical representations determined to be mathematically similar to the prior query and the query;

causing presentation of the recommended answer on a display associated with the agent device;

receiving, from the agent device, second input that includes an answer provided by the agent to the query;

determining, using automated data tracking techniques, implicit feedback indicating a relevancy of the recommended answer for responding to the query, the determining the implicit feedback including determining(i) a duration the recommended answer remains in a viewport of the agent device, (ii) a modification made by the agent to the recommended answer before sending a response, and (iii) that the second input was received from the agent device within a threshold amount of conversation turns of the communication session from when the recommended answer was presented; and based at least in part on the implicit feedback and on the second input being received within the threshold amount of conversation turns from when the recommended answer was presented, adjusting a confidence value associated with the recommended answer being used for responding to the query, wherein the confidence value indicates a likelihood that the recommended answer is relevant to use for responding to the query, wherein adjusting the confidence value includes dynamically updating the model to refine future recommendations and reducing presentation frequency for low-confidence answers.

9. The system of claim 8, wherein determining the implicit feedback includes:

determining that the recommended answer was presented at least partially in the viewport of the display for a period of time; and determining whether the period of time was greater than or equal to a threshold period of time; and wherein adjusting the confidence value comprises:

in response to determining that the period of time being greater than or equal to the threshold period of time, increasing the confidence value; or in response to determining that the period of time being less than the threshold period of time, decreasing the confidence value.

10. The system of claim 8, wherein determining the implicit feedback includes:
obtaining first text data representing the recommended answer;
obtaining second text data representing the answer;
determining a similarity score indicating a measure of similarity between the first text data and the second text data; and
determining whether the similarity score is greater than or equal to a threshold similarity score; and
wherein adjusting the confidence value comprises:
in response to determining that the similarity score is greater than or equal to the threshold similarity score, increasing the confidence value; or
in response to determining that the similarity score is less than the threshold similarity score, decreasing the confidence value.

11. The system of claim 8, wherein determining the implicit feedback includes:
identifying, using a sentiment-analysis model of the agent-assist system, a first sentiment of the user prior to receiving the second input that includes the answer provided by the agent;
identifying, using the sentiment-analysis model, a second sentiment of the user subsequent to receiving the second input that includes the answer provided by the agent; and
determining a sentiment change for the user using the first sentiment and the second sentiment, and
wherein adjusting the confidence value comprises:
in response to determining that the sentiment change indicates the sentiment of the user has increased, increasing the confidence value; or
in response to determining that the sentiment change indicates the sentiment of the user has decreased, decreasing the confidence value.

12. The system of claim 8, wherein:
determining the implicit feedback includes determining that the recommended answer has been presented to the agent more than a threshold number of times during a period of time; and
adjusting the confidence value includes decreasing the confidence value based at least in part on the recommended answer having been presented to the agent more than the threshold number of times during the period of time.

13. The system of claim 8, the operations further comprising:
determining explicit feedback indicating relevancy of the recommended answer for responding to the query; and
adjusting the confidence value based at least in part on the explicit feedback.

14. The system of claim 8, the operations further comprising:
receiving third input from the user of the user device, the third input including a second query for the agent to answer;
determining that the knowledge base does not include recommended answers for the second query; and
outputting, to an administrative account associated with the knowledge base, an indication that the knowledge base does not include recommended answers for the second query.

15. A method comprising:
obtaining a plurality of documents at an agent-assist system, the plurality of documents including subdocuments;
converting subdocuments into mathematical representations of semantic meanings of the subdocuments;
storing the mathematical representations of the semantic meanings of the subdocuments in a knowledge base of the agent-assist system;
establishing, partly by an agent device, a communication session with a user device, the communication session facilitating a conversation between a user of the user device and an agent associated with the agent device;
presenting, on a display of the agent device, one or more user interfaces (UIs) that represents at least the conversation between the agent and the user;
receiving first input from the user device, the first input representing a query from the user for the agent to answer;
retrieving, using a model trained on historical interactions, a recommended answer from the knowledge base of the agent-assist system, wherein the retrieving the recommended answer for responding to the query includes:
identifying a prior query in the communication session that is related to the query;
using a conversation-context-aware semantic search algorithm, ranking candidate answers from the model based on contextual similarity between the prior query and the query, wherein the candidate answers have corresponding mathematical representations determined to be mathematically similar to the prior query and the query;
presenting the recommended answer in the one or more UIs on the display;
identifying second input at the agent device, the second input representing an answer provided by the agent to respond to the query;
determining implicit feedback indicating a relevancy of the recommended answer for responding to the query, the determining the implicit feedback including:
determining that the recommended answer was presented at least partially in a viewport of the display for a period of time and determining whether the period of time was greater than or equal to a threshold period of time;
determining a duration the recommended answer remains in a viewport of the agent device;
determining a modification made by the agent to the recommended answer before sending a response; and
determining a sentiment analysis of user responses following answer presentation;
providing the implicit feedback to the agent-assist system; and
adjusting, by the agent-assist system, a confidence value associated with the recommended answer being used for responding to the query, the adjusting comprising:
in response to determining that the period of time being greater than or equal to the threshold period of time, increasing the confidence value; or
in response to determining that the period of time being less than the threshold period of time, decreasing the confidence value,
wherein adjusting the confidence value includes dynamically updating the model to refine future recommendations and reducing presentation frequency for low-confidence answers.

16. The method of claim 15, wherein determining the implicit feedback includes:

obtaining first text data representing the recommended answer;

obtaining second text data representing the answer;

determining a similarity score indicating a measure of similarity between the first text data and the second text data; and determining whether the similarity score is greater than or equal to a threshold similarity score, further comprising adjusting, by the agent-assist system, a confidence value associated with the recommended answer being used for responding to the query, the adjusting comprising:

in response to determining that the similarity score is greater than or equal to the threshold similarity score, increasing the confidence value; or in response to determining that the similarity score is less than the threshold similarity score, decreasing the confidence value.

17. The method of claim 15, wherein determining the implicit feedback includes:

identifying, using a sentiment-analysis model of the agent-assist system, a first sentiment of the user prior to receiving the second input that includes the answer provided by the agent;

identifying, using the sentiment-analysis model, a second sentiment of the user subsequent to receiving the second input that includes the answer provided by the agent; and determining a sentiment change for the user using the first sentiment and the second sentiment, further comprising adjusting, by the agent-assist system, a confidence value associated with the recommended answer being used for responding to the query, the adjusting comprising:

in response to determining that the sentiment change indicates the sentiment of the user has increased, increasing the confidence value; or in response to determining that the sentiment change indicates the sentiment of the user has decreased, decreasing the confidence value.

\* \* \* \* \*